US012779333B2

(12) United States Patent
Liu

(10) Patent No.: US 12,779,333 B2
(45) Date of Patent: Nov. 3, 2026

(54) METHOD AND APPARATUS FOR CONTROLLING VIRTUAL OBJECT, DEVICE, STORAGE MEDIUM, AND PROGRAM PRODUCT

(71) Applicant: Tencent Technology (Shenzhen) Company Limited, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 195 days.

(21) Appl. No.: 18/742,978

(22) Filed: Jun. 13, 2024

(65) Prior Publication Data

US 2024/0335752 A1 Oct. 10, 2024

Related U.S. Application Data

(63) Continuation of application No. PCT/CN2023/091178, filed on Apr. 27, 2023.

(30) Foreign Application Priority Data

Jul. 12, 2022 (CN) ......................... 202210822326.7

(51) Int. Cl.
*A63F 13/55* (2014.01)
*A63F 13/24* (2014.01)
*G06T 19/20* (2011.01)

(52) U.S. Cl.
CPC .............. *A63F 13/55* (2014.09); *A63F 13/24* (2014.09); *G06T 19/20* (2013.01); *G06T 2219/2004* (2013.01)

(58) Field of Classification Search
None
See application file for complete search history.

(56) References Cited

U.S. PATENT DOCUMENTS

2012/0220372 A1* 8/2012 Cheung .................... A63F 13/22 463/37
2015/0182856 A1* 7/2015 Mays, III .............. G06F 3/0488 463/31

(Continued)

FOREIGN PATENT DOCUMENTS

CN 108509139 A 9/2017
CN 108379844 A 8/2018

(Continued)

OTHER PUBLICATIONS

CN113398573 (Year: 2021).*

(Continued)

*Primary Examiner* — Jason T Yen
(74) *Attorney, Agent, or Firm* — Morgan, Lewis & Bockius LLP

(57) ABSTRACT

A method for controlling a virtual object in a virtual environment performed by a computer device is provided. The method includes: displaying a joystick control for controlling movement of the virtual object in the virtual scene, the joystick control comprising a plurality of trigger regions, each trigger regions having a unique sensitivity; detecting a first sliding operation whose start position is located in a first trigger region of the plurality of trigger regions; determining a first movement speed of the virtual object based on a sensitivity of the first trigger region; and controlling the virtual object to move at the first movement speed. A user may start performing a sliding operation at the trigger regions with the different sensitivities based on different demands, so that the virtual object can be controlled to move at different speeds, thereby enriching a manner for controlling the virtual object, and improving human-computer interaction efficiency.

17 Claims, 11 Drawing Sheets

(56) References Cited

U.S. PATENT DOCUMENTS

| | | | | |
|---|---|---|---|---|
| 2017/0007921 | A1* | 1/2017 | Baba | G06F 3/04845 |
| 2019/0060767 | A1* | 2/2019 | Shao | A63F 13/2145 |
| 2022/0080313 | A1* | 3/2022 | Wu | G06F 3/04817 |

FOREIGN PATENT DOCUMENTS

| | | | | | |
|---|---|---|---|---|---|
| CN | 111111190 | A | | 5/2020 | |
| CN | 111330272 | A | | 6/2020 | |
| CN | 113181651 | A | | 7/2021 | |
| CN | 113398573 | | * | 9/2021 | A63F 13/42 |
| CN | 113398573 | A | | 9/2021 | |
| JP | 2011141632 | A | | 7/2011 | |
| JP | 2020178822 | A | | 11/2020 | |
| WO | WO 2020244421 | A1 | | 12/2020 | |

OTHER PUBLICATIONS

Tencent Technology, WO+IPRP, PCT/CN2023/091178, Dec. 18, 2024, 5 pgs.
Tencent Technology, ISR, PCT/CN2023/091178, Aug. 12, 2023, 3 pgs.

* cited by examiner

METHOD AND APPARATUS FOR CONTROLLING VIRTUAL OBJECT, DEVICE, STORAGE MEDIUM, AND PROGRAM PRODUCT

CROSS-REFERENCE TO RELATED APPLICATIONS

This application is a continuation application of PCT Patent Application No. PCT/CN2023/091178, entitled "METHOD AND APPARATUS FOR CONTROLLING VIRTUAL OBJECT, DEVICE, STORAGE MEDIUM, AND PROGRAM PRODUCT" filed on Apr. 27, 2023, which claims priority to Chinese Patent Application No. 202210822326.7, entitled "METHOD AND APPARATUS FOR CONTROLLING VIRTUAL OBJECT, DEVICE, STORAGE MEDIUM, AND PROGRAM PRODUCT" filed on Jul. 12, 2022, both of which are incorporated herein by reference in their entirety.

FIELD OF THE TECHNOLOGY

Embodiments of this application relate to the field of computer and Internet technologies, and in particular, to a method and an apparatus for controlling a virtual object, a device, a storage medium, and a program product.

BACKGROUND OF THE DISCLOSURE

In a shooting game round, a user may control movement of a virtual object by using a joystick control.

In related art, when a finger of the user touches the joystick control, a movement direction of the virtual object may be controlled based on a direction of a sliding operation of the finger. Manners for controlling the virtual object are limited and most manners involve similar gestures and lack variation.

SUMMARY

Embodiments of this application provide a method and an apparatus for controlling a virtual object, a device, a storage medium, and a program product. The technical solutions are as follows.

According to an aspect of embodiments of this application, a method for controlling a virtual object in a virtual environment is performed by a computer device, and the method includes:

- displaying a joystick control for controlling movement of the virtual object in the virtual scene, the joystick control comprising a plurality of trigger regions, each trigger regions having a unique sensitivity;
- detecting a first sliding operation whose start position is located in a first trigger region of the plurality of trigger regions;
- determining a first movement speed of the virtual object based on a sensitivity of the first trigger region; and
- controlling the virtual object to move at the first movement speed.

The first trigger region and the second trigger region are respectively one of the plurality of trigger regions, the first trigger region is different from the second trigger region, and the first movement speed is different from the second movement speed.

According to an aspect of embodiments of this application, a computer device is provided. The computer device includes a processor and a memory. The memory has a computer program stored therein, and the computer program is loaded and executed by the processor and causes the computer device to implement the foregoing methods.

According to an aspect of embodiments of this application, a non-transitory computer-readable storage medium is provided. The readable storage medium has a computer program stored therein, and the computer program is loaded and executed by a processor of a computer device and causes the computer device to implement the foregoing methods.

The technical solutions provided in embodiments of this application may include the following beneficial effects.

The plurality of trigger regions corresponding to the different sensitivities are set, the movement speed of the virtual object is determined based on a sensitivity of a trigger region in which a start position of a sliding operation of a user is located, and the virtual object is controlled to move at the movement speed, so that the user can start performing the sliding operation at the trigger regions with the different sensitivities based on different demands, and the virtual object can be controlled to move at different speeds, thereby enriching a manner for controlling the virtual object, and improving human-computer interaction efficiency.

DESCRIPTION OF EMBODIMENTS

Figure 1:
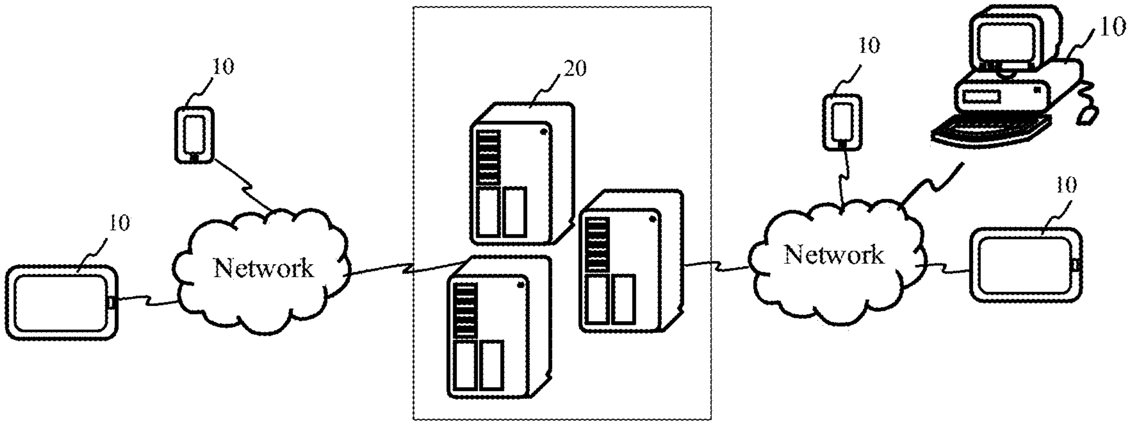
FIG. 1 is a schematic diagram of a solution implementation environment according to an embodiment of this application.

FIG. 1 is a schematic diagram of a solution implementation environment according to an embodiment of this application. The solution implementation environment may be implemented as a system for controlling a virtual object. The solution implementation environment may include: a terminal device 10 and a server 20.

The terminal device 10 may be an electronic device such as a mobile phone, a tablet computer, a game console, an e-reader, a multimedia playback device, a wearable device, a personal computer (PC), or a vehicle-mounted terminal. A client of a target application program (for example, a game application program) may be installed in the terminal device 10. In some embodiments, the target application program may be an application program that needs to be downloaded for installation, or may be a click-and-run application program. This is not limited in this embodiment of this application.

In this embodiment of this application, the target application program may be a shooting application program, a racing application program, a multiplayer online battle arena game, or the like. This is not limited in this application. In some embodiments, the target application program may be the shooting application program. The shooting application program can provide a virtual environment for a virtual object operated by a user to move therein. Typically, the shooting application program may be any application program having a shooting product function, such as a third-person shooting game (TPS), a first-person shooting game (FPS), a multilayer online battle arena (MOBA) game, a multiplayer gunfight-type survival game, a virtual reality (VR)-type shooting application program, an augmented reality (AR)-type shooting application program, a three-dimensional map program, a social-type application program, or an interactive entertainment-type application program. In addition, forms or shapes of virtual objects provided by different application programs may be different, and corresponding functions may also be different. The form, shape, and function all may be designed based on an actual demand. This is not limited in this embodiment of this application. In some embodiments, the client of the foregoing application program is run in the terminal device 10. In some embodiments, the application program is an application program developed based on a three-dimensional virtual environment engine. For example, the virtual environment engine is a Unity engine. The virtual environment engine can construct a three-dimensional virtual environment, a three-dimensional virtual object, a three-dimensional virtual item, and the like, to provide more immersive game experience for the user.

The virtual environment is a scene displayed (or provided) when the client of the target application program (for example, the game application program) is run in the terminal device. The virtual environment refers to a scene created for a virtual object to perform an activity (for example, a game battle), such as a virtual house, a virtual island, or a virtual map. The virtual environment may be a simulated environment of a real world, a semi-simulated semi-imaginary environment, or a purely imaginary environment. The virtual environment may be a two-dimensional virtual environment, a 2.5-dimensional virtual environment, or a three-dimensional virtual environment. This is not limited in this embodiment of this application.

The virtual object refers to a virtual character, a virtual vehicle, a virtual item, or the like that is controlled by a user account in the target application program. This is not limited in this application. For example, the target application program is the game application program. The virtual object refers to a game character that is controlled by the user account in the game application program. The virtual object may be in a form of a figure, a form of an animal, a cartoon form, or another form. This is not limited in this embodiment of this application. The virtual object may be presented in a three-dimensional form or a two-dimensional form. This is not limited in this embodiment of this application. In some embodiments, when the virtual environment is the three-dimensional virtual environment, the virtual object is a three-dimensional stereoscopic model created based on an animation skeleton technique. Each virtual object has a shape and a volume in the three-dimensional virtual environment, and occupies a part of space in the three-dimensional virtual environment. In some embodiments, the virtual object is a virtual vehicle in the virtual environment, for example, a virtual item that can be controlled by the user, such as a virtual car, a virtual hot balloon, or a virtual motorcycle.

The server 20 is configured to provide a background service for the client of the target application program installed and run in the terminal device 10. For example, the server 20 may be a background server of the foregoing game application program. The server 20 may be one server, a server cluster including a plurality of servers, or a cloud computing service center. In some embodiments, the server 20 may simultaneously provide the background service for a plurality of target application programs in the terminal device 10.

The terminal device 10 may communicate with the server 20 through a network.

Figure 2:
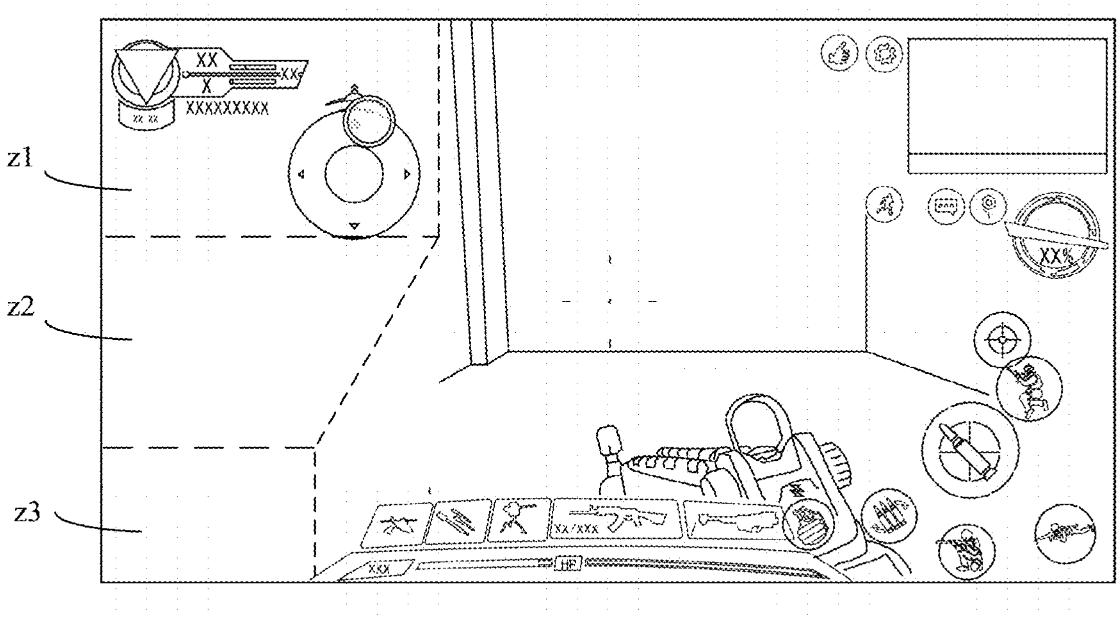
FIG. 2 is a schematic diagram of a method for controlling a virtual object according to an embodiment of this application.

FIG. 2 is a schematic diagram of a method for controlling a virtual object according to an embodiment of this application. A user interface is displayed in the terminal device 10 shown in FIG. 1. A plurality of trigger regions are disposed in the user interface. The trigger regions are respectively a trigger region z1, a trigger region z2, and a trigger region z3. The three trigger regions respectively correspond to different sensitivities. The sensitivity of the trigger region is related to a movement speed of a virtual object. When a start position of a sliding operation of a user is located in the trigger region z1 of the plurality of trigger regions, the movement speed of the virtual object is determined based on the sensitivity of the trigger region z1, and the virtual object is controlled to move at the speed.

In the technical solution provided in this embodiment of this application, the plurality of trigger regions are disposed in the user interface. The different trigger regions correspond to the different sensitivities, and the different sensitivities correspond to different movement speeds of the virtual object. When the start position of the sliding operation of the user is in a target trigger region, the movement speed of the virtual object is determined based on a sensitivity of the target trigger region, and the virtual object is controlled to move at the movement speed. In other words, before starting a battle round, the user may set the trigger region based on an operating habit of the user. The setting of the trigger region includes but is not limited to a size of the region, the sensitivity of the region, and the like. During the battle round, the user may adjust the start position of the sliding operation based on a real-time situation, so that the movement speed of the virtual object can change, thereby further improving control on the virtual object by the user, and also improving round experience of the user.

Figure 3:
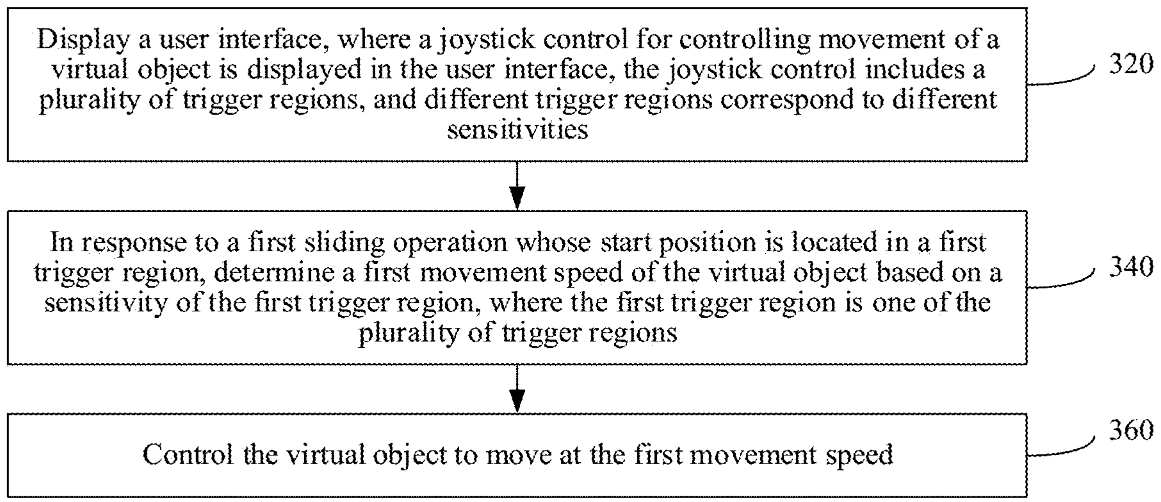
FIG. 3 is a flowchart of a method for controlling a virtual object according to an embodiment of this application.

FIG. 3 is a flowchart of a method for controlling a virtual object according to an embodiment of this application. An entity executing each operation of the method may be the terminal device 10 in the solution implementation environment shown in FIG. 1. For example, the entity executing each operation may be the client of the target application program. In the following method embodiments, for case of description, the entity executing each operation being a "client" is used for introduction and description. The method may include at least one of the following operations (320 to 360).

Operation 320: Display a user interface, where a joystick control for controlling movement of a virtual object is displayed in the user interface, the joystick control includes a plurality of trigger regions, and different trigger regions correspond to different sensitivities.

Joystick control: The joystick control may also be referred to as a virtual joystick, including a wheel portion and a remote sensing portion. The wheel portion is an operable range of the virtual joystick. When no operation is performed by a user, a position of the remote sensing portion does not change. In some embodiments, the remote sensing portion slides within the range of the wheel portion as a finger slides, and the user may slide the remote sensing portion arbitrarily within the range of the wheel portion. In some embodiments, the joystick control may control a movement direction of the virtual object.

The trigger region refers to a specific region in the interface, and different trigger regions correspond to different sensitivities. The region may be set by a server, or may be set or adjusted by the user. In this embodiment of this application, a size and a shape of the trigger region are not limited. For example, the shape of the trigger region may be a rectangle, a circular circle, or a rounded rectangle. The size of the trigger region may be properly set with reference to an interface layout. In addition, sizes and shapes of different trigger regions may be the same or different. This is not limited in this application.

The sensitivity in this embodiment of this application refers to a movement sensitivity, and may be understood as that the user performs a same sliding operation in different trigger regions, but speeds at which the virtual object are controlled to move are different. In some embodiments, similarly, the user performs the sliding operation in the user interface. When a start position of the sliding operation is located in different trigger regions, movement speeds that correspond to the different trigger regions and that are of the virtual object are different. In some embodiments, a corresponding movement speed of the virtual object in one trigger region is 10 m/s, and a corresponding movement speed of the virtual object in another trigger region is 20 m/s.

Figure 4:
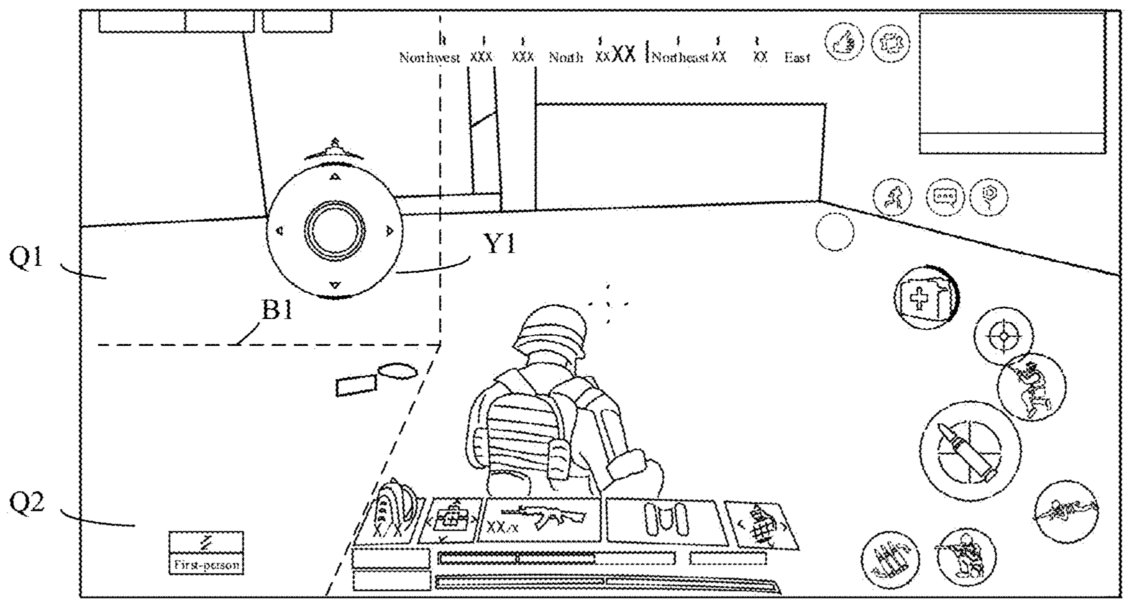
FIG. 4 is a schematic diagram of a user interface according to an embodiment of this application.

FIG. 4 is a schematic diagram of a user interface according to an embodiment of this application. A joystick control Y1 for controlling movement of a virtual object is displayed in the user interface. The joystick control includes two trigger regions, which are respectively a trigger region Q1 and a trigger region Q2. Different trigger regions correspond to different sensitivities. In some embodiments, a sensitivity of the trigger region Q1 is x, a sensitivity of the trigger region Q2 is y, and both x and y are positive numbers. The joystick control Y1 shown in FIG. 4 is in the trigger region Q1, and a sensitivity of the joystick control Y1 is x.

Operation 340: In response to a first sliding operation whose start position is located in a first trigger region, determine a first movement speed of the virtual object based on a sensitivity of the first trigger region, where the first trigger region is one of the plurality of trigger regions.

The first sliding operation is an action performed by the user. In some embodiments, a terminal device is a hand-held device, and the first sliding operation of the user is an operation directly performed on the terminal device, such as a sliding operation, a press operation, or a dragging operation on a mobile phone screen. In some embodiments, the terminal device is not a hand-held device, and the first sliding operation of the user may be an operation performed on a peripheral of the terminal device, such as a double-click operation on a mouse, a tap operation on a keyboard, or a tap or shake operation on a gamepad. A type of the first sliding operation is not limited in this application. In some embodiments, the sliding operation includes the start position and a real-time position. For example, the sliding operation is the sliding operation on the mobile phone screen. In this case, the start position is a position at which a finger first touches the screen. Then the finger slides on the screen, to perform the sliding operation. During the sliding operation, a position at which the finger currently touches the screen is the real-time position of the sliding operation. When the finger leaves the screen, the sliding operation ends.

Figure 5:
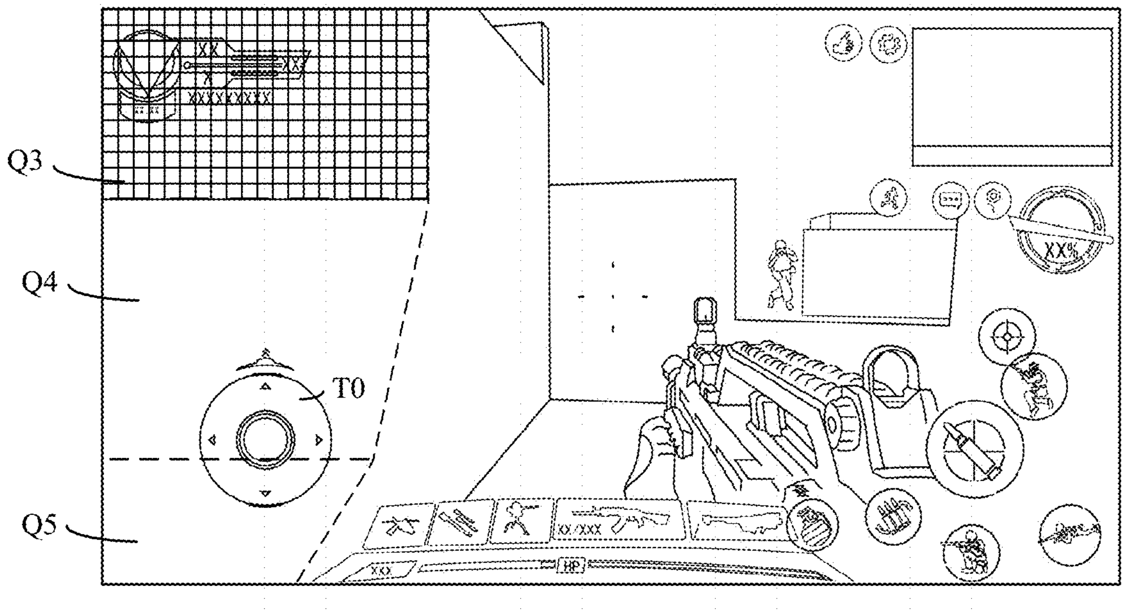
FIG. 5 is a schematic diagram of a user interface according to another embodiment of this application.

FIG. 5 is a schematic diagram of a user interface according to another embodiment of this application. A joystick control for controlling movement of a virtual object is displayed in the user interface. The joystick control includes three trigger regions, which are respectively a trigger region Q3, a trigger region Q4, and a trigger region Q5. Different trigger regions correspond to different sensitivities. In some embodiments, a sensitivity of the trigger region Q3 is 10, a sensitivity of the trigger region Q4 is 8, and a sensitivity of Q5 is 5. The joystick control shown in FIG. 5 is in the trigger region Q5, and a sensitivity of the joystick control Y1 is 5.

In some embodiments, movement speeds corresponding to the different sensitivities are preset by a server. In some embodiments, a sensitivity 1 indicates that the movement speed of the virtual object is 1 m/s, a sensitivity 2 indicates that the movement speed of the virtual object is 2 m/s, and so on. In this case, it is determined, based on that the sensitivity of the trigger region Q5 shown in FIG. 5 is 5, that the first movement speed of the virtual object is 5 m/s.

In some embodiments, the sensitivities of the different trigger regions may be set by the user in a custom manner. The sensitivity may be set by the user before the user enters a game round, or may be set by the user based on a real-time situation of the round after the user enters the game round. In some embodiments, the sensitivities of the trigger region Q3, the trigger region Q4, and the trigger region Q5 in FIG. 5 are initially set to 10, 8, and 5 respectively. However, in consideration of that the sensitivity of the trigger region Q5 does not need to reach 5, the user may set the sensitivity of the trigger region Q5. After the sensitivity is adjusted, when the sensitivity of the joystick control in the trigger region Q5 changes, the movement speed of the virtual object also correspondingly changes in response to the sliding operation of the user. For example, when the sensitivity of the trigger region Q5 is adjusted from 5 to 3, the movement speed of the virtual object is adjusted to 3 m/s.

In some embodiments, no overlapping region exists between any two of the plurality of trigger regions. For example, in the user interfaces shown in FIG. 4 and FIG. 5, no overlapping region exists between the trigger regions. The trigger region in which the start position of the sliding operation performed by the user falls is determined as a selected trigger region. For example, the trigger region in which the start position of the first sliding operation falls is determined as the first trigger region. In some embodiments, when the start position of the sliding operation falls at a boundary of the trigger region, a trigger region with a largest sensitivity among trigger regions near the boundary may be set as the first trigger region, or a trigger region with a smallest sensitivity among the trigger regions near the boundary may be set as the first trigger region. In some embodiments, the start position of the sliding operation falls at a boundary B1 (shown by a dashed line in the figure) of the user interface shown in FIG. 4. In this case, the trigger region Q1 or the trigger region Q2 is determined as the first trigger region. Alternatively, a trigger region with a larger sensitivity between the trigger region Q1 and the trigger region Q2 is determined as the first trigger region.

Figure 6:
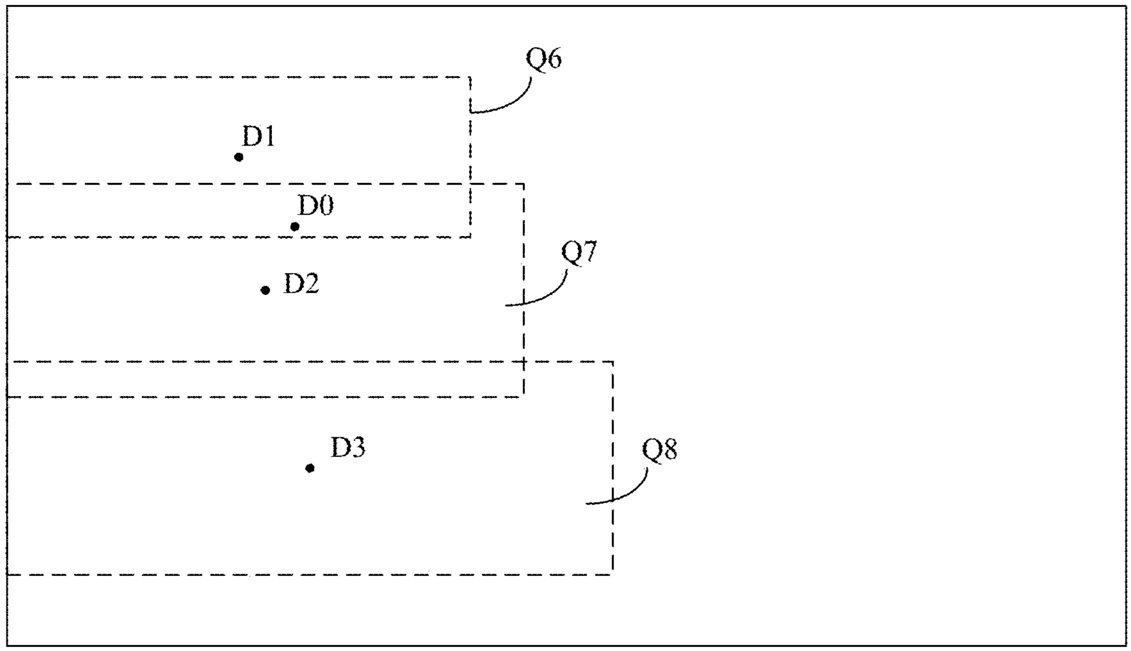
FIG. 6 is a schematic diagram of a user interface according to another embodiment of this application.

In some embodiments, at least two of the plurality of trigger regions overlap. When the first sliding operation is detected, the start position of the first sliding operation is obtained; a spacing between the start position of the first sliding operation and a reference point of each of the trigger regions is determined, where positions of reference points of the trigger regions are different from each other; and a trigger region having a smallest spacing is determined, from the plurality of trigger regions, as the first trigger region. That "two trigger regions overlap" described in this embodiment of this application refers to that an overlapping region exists between the two trigger regions, but correspondingly, a non-overlapping region also exists. In other words, the two trigger regions do not overlap completely, but partially overlap. For example, in a user interface shown in FIG. 6, there is a trigger region Q6, a trigger region Q7, and a trigger region Q8, and there is overlap among the three trigger regions. An overlapping part exists between the trigger region Q6 and the trigger region Q7, but a non-overlapping part relative to the trigger region Q7 exists in the trigger region Q6, and a non-overlapping part relative to the trigger region Q6 also exists in the trigger region Q7. In some embodiments, the trigger region in which the start position of the first sliding operation falls is determined as the first trigger region. When the start position of the sliding operation falls in an overlapping region, a trigger region with a largest sensitivity among trigger regions near the overlapping region may be set as the first trigger region, or a trigger region with a smallest sensitivity among the trigger regions near the overlapping region may be set as the first trigger region. In some embodiments, a closest trigger region is selected as the selected trigger region based on the spacing between the start position of the sliding operation and the reference point of each of the trigger regions. In some embodiments, the reference point is a center position of the trigger region or another position that can represents the trigger region. As shown in FIG. 6, the start position of the sliding operation is D0, D1 is a center position of the trigger region Q6, D2 is a center position of the trigger region Q7, and D3 is a center position of the trigger region Q8. In this case, the start position D0 of the sliding operation is in the overlapping region between the trigger region Q6 and the trigger region Q7. A distance from D0 to D1 and a distance from D0 to D2 are determined, and the distance from D0 to D2 is smaller. In this case, the trigger region Q7 in which D2 is located is determined as the selected first trigger region.

In this embodiment of this application, on one hand, the plurality of trigger regions are arranged in an overlapping manner, so that an area occupied by the trigger regions in the interface can be reduced, to avoid impact on arrangement of another control in the interface. On the other hand, when the plurality of trigger regions are arranged in the overlapping manner, the trigger region closest to an operation position is selected as the trigger region selected by the user, so that it is ensured that the trigger region can be correctly selected.

Figure 7:
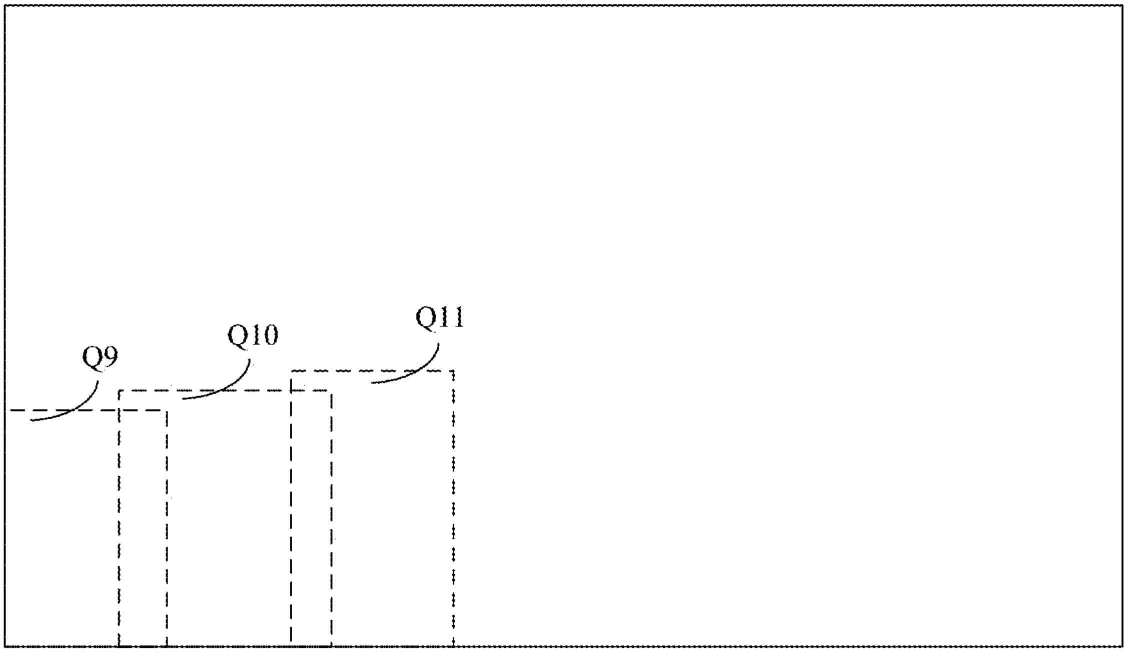
FIG. 7 is a schematic diagram of a user interface according to another embodiment of this application.

A region, a shape, and arrangement of the sliding operation are not limited in this embodiment of this application. For example, the three trigger regions in FIG. 6 are vertically distributed. In some embodiments, the three trigger regions may alternatively be horizontally distributed. As shown in FIG. 7, a trigger region Q9, a trigger region Q10, and a trigger region Q11 are horizontally distributed. In this embodiment of this application, positions of the plurality of trigger regions are arranged in ascending or descending order of the sensitivities respectively corresponding to the plurality of trigger regions. In some embodiments, sensitivities of the trigger region Q9, the trigger region Q10, and the trigger region Q11 that are horizontally distributed in FIG. 7 are in ascending order. In some embodiments, the sensitivities of the trigger region Q6, the trigger region Q7, and the trigger region Q8 in FIG. 6 are in descending order. In this way, a mistaken touch on the trigger region by the user can be avoided, and the regular ascending or descending order helps the user remember more easily and facilitates a user operation.

In the technical solutions provided in this embodiment of this application, the setting of the trigger region can satisfy different demands of the user. When the trigger region is not expected to occupy excessively large region of the user interface, the trigger regions may be arranged horizontally, to reduce the region that the trigger region needs to occupy. When the user needs to expand the trigger region, the vertically distributed trigger regions may alternatively be selected. A larger trigger region indicates a lower operation requirement on the user, and a smaller trigger region indicates a higher operation requirement on the user. Therefore, demands of different users can be satisfied. The setting of the trigger region is friendly to a novice player and may also satisfy a demand of an experienced player, so that user experience is good.

Operation 360: Control the virtual object to move at the first movement speed.

After determining the first movement speed of the virtual object, the client may control the virtual object to move at the first movement speed.

In some embodiments, the first movement speed of the virtual object is not only related to the sensitivity of the trigger region, but also related to a plurality of other factors, such as a vehicle taken by the virtual object, an environment in which the virtual object is located, and a wearing of the virtual object. For details, refer to the following embodiment, and details are not described herein.

In some embodiments, a numerical value of the first movement speed is displayed in the user interface, so that the user can grasp the movement speed of the currently controlled virtual object. In addition, the start position of the sliding operation may be adjusted at any moment based on a real-time situation of the virtual environment, to obtain the different movement speeds corresponding to the different trigger regions. The user may adjust the operation in time based on numerical information, so that the round is more strategic. In some embodiments, the different movement speeds may correspond to different animation effects, so that the user can have stronger immersion in the virtual object, and experience is better.

In the technical solutions provided in this embodiment of this application, the plurality of trigger regions corresponding to the different sensitivities are set, the movement speed of the virtual object is determined based on the sensitivity of the trigger region in which the start position of the sliding operation of the user is located, and the virtual object is controlled to move at the movement speed, so that the user can start performing the sliding operation at the trigger regions with the different sensitivities based on different demands, and the virtual object can be controlled to move at different speeds, thereby enriching a manner for controlling the virtual object, and improving human-computer interaction efficiency.

In addition, in the technical solutions provided in this embodiment of this application, the user does not need to manually set the sensitivity in the round, thereby simplifying the user operation, and helping to improve flexibility and efficiency of controlling the movement of the virtual object by the user.

Figure 8:
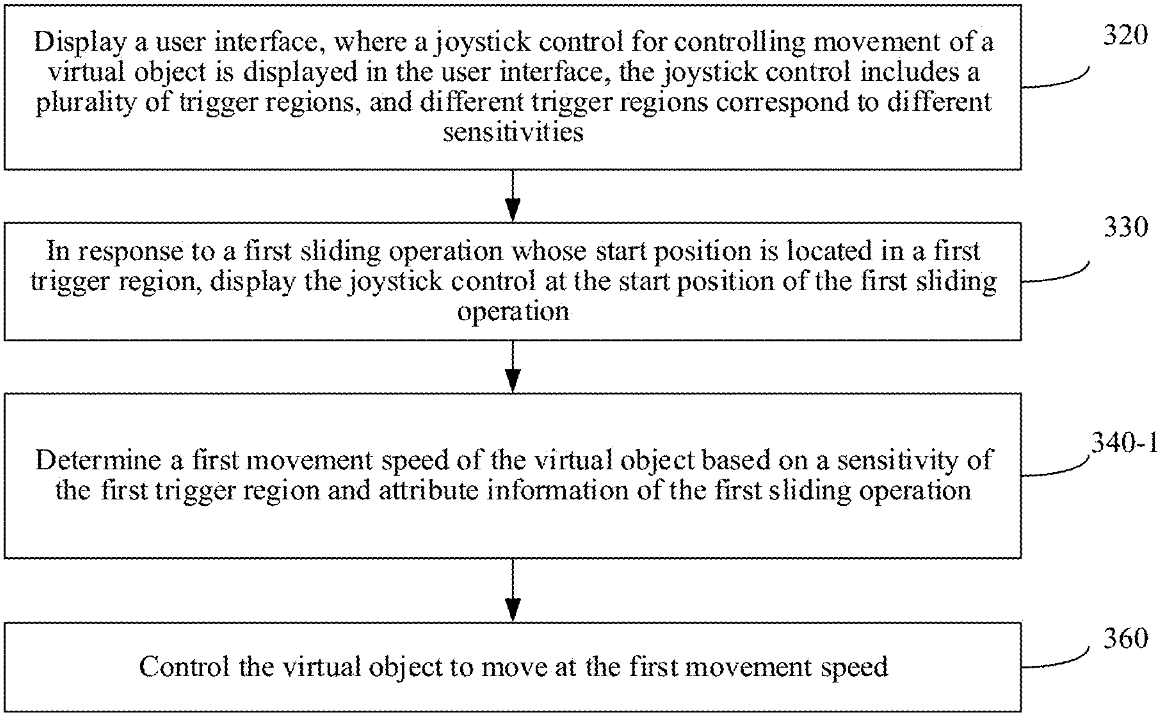
FIG. 8 is a flowchart of a method for controlling a virtual object according to another embodiment of this application.

FIG. 8 is a flowchart of a method for controlling a virtual object according to another embodiment of this application. An entity executing each operation of the method may be the terminal device 10 in the solution implementation environment shown in FIG. 1. For example, the entity executing each operation may be the client of the target application program. In the following method embodiments, for ease of description, the entity executing each operation being a "client" is used for introduction and description. The method may include at least one of the following operations (320 to 360).

Operation 320: Display a user interface, where a joystick control for controlling movement of a virtual object is displayed in the user interface, the joystick control includes a plurality of trigger regions, and different trigger regions correspond to different sensitivities.

Operation 330: In response to a first sliding operation whose start position is located in a first trigger region, display the joystick control at the start position of the first sliding operation.

The first trigger region is one of the plurality of trigger regions.

In some embodiments, the joystick control is moved to and displayed at the start position of the first sliding operation, that is, a movement process of the first sliding operation from an original display position to the start position is displayed. Alternatively, the displaying of the joystick control at the original display position of the joystick control is canceled and the joystick control is displayed at the start position of the first sliding operation.

Operation 340-1: Determine a first movement speed of the virtual object based on a sensitivity of the first trigger region and attribute information of the first sliding operation.

The attribute information is information related to the first sliding operation. In some embodiments, the attribute information includes: a distance between a real-time position and the start position that are of the first sliding operation.

In some embodiments, the distance between the real-time position and the start position that are of the first sliding operation is positively correlated with the movement speed. For example, when the distance between the real-time position and the start position that are of the first sliding operation is 1 cm, the movement speed is 1 m/s, when the distance between the real-time position and the start position that are of the first sliding operation is 2 cm, the movement speed is 2 m/s, and so on.

In some embodiments, the first movement speed of the virtual object is determined based on the sensitivity of the first trigger region and the attribute information of the first sliding operation. In the foregoing embodiment, the sensitivity may correspond to different movement speeds, and the attribute information of the sliding operation may also correspond to different movement speeds. A movement speed corresponding to the sensitivity of the trigger region in which the start position of the sliding operation is located may be denoted as a first movement speed, and a movement speed corresponding to the attribute information of the first sliding operation may be denoted as a second movement speed. A value relationship between the first movement speed and the second movement speed is determined, and a larger movement speed may be determined as the first movement speed of the virtual object.

In some embodiments, the first movement speed of the virtual object is determined based on both the sensitivity of the first trigger region and the attribute information of the first sliding operation. In some embodiments, the sensitivity of the first trigger region and the attribute information of the first sliding operation correspond to different weights respectively. The movement speed corresponding to the sensitivity of the trigger region in which the start position of the sliding operation is located may be denoted as the first movement speed, the movement speed corresponding to the attribute information of the first sliding operation may be denoted as the second movement speed, and a final movement speed is determined based on proportions of the two movement speeds.

In some embodiments, a sensitivity correction parameter is determined based on the distance. The sensitivity correction parameter is configured for adjusting the sensitivity of the trigger region. The first movement speed of the virtual object is determined based on the sensitivity correction parameter and the sensitivity of the first trigger region.

In some embodiments, the sensitivity correction parameter is related to the distance, and when the distance changes, the sensitivity correction parameter also changes. In other words, the distance is positively correlated with the sensitivity correction parameter. In some embodiments, different distance scopes correspond to different sensitivity correction parameters. For example, the sensitivity correction parameter is d1 when the distance is in a range from a1 to b1, and the sensitivity correction parameter is d2 when the distance is in a range from a2 to b2. The sensitivity correction parameter may alternatively be understood as a scope function, and different scopes correspond to different values, where a1, b1, d1, a2, b2, and d2 are all positive numbers.

A corrected sensitivity is determined based on the sensitivity correction parameter and the sensitivity of the first trigger region, and the first movement speed of the virtual object is determined based on the corrected sensitivity. The corrected sensitivity may be determined based on the sensitivity correction parameter and the sensitivity of the first trigger region in an addition or multiplication manner, and a specific algorithm is not limited in this application.

In some embodiments, the attribute information is information related to the first sliding operation. In some embodiments, the attribute information includes: attribute information other than the distance of the first sliding operation, such as a pressure value of the first sliding operation. In some embodiments, the pressure value of the sliding operation is positively correlated with the movement speed of the virtual object. When the pressure value of the sliding operation is a first pressure value, the movement speed of the virtual object is a first speed, and when the pressure value of the sliding operation is a second pressure value, the movement speed of the virtual object is a second speed. The first pressure value is greater than the second pressure value, and the first speed is greater than the second speed.

In some embodiments, the attribute information is information related to the first sliding operation. In some embodiments, the attribute information includes: attribute information other than the distance of the first sliding operation, such as a size of the trigger region covered by the first sliding operation. In some embodiments, the size of the trigger region covered by the sliding operation is positively correlated with the movement speed of the virtual object. When the size of the trigger region covered by the sliding operation is a first area, the movement speed of the virtual object is a third speed, and when the size of the trigger region covered by the sliding operation is a second area, the movement speed of the virtual object is a fourth speed. When the first area is greater than the second area, the third speed is greater than the fourth speed.

In some embodiments, the movement speed of the virtual object is alternatively related to a virtual environment position/region (such as a flat ground, a grassland, a snowfield, or a river) in which the virtual object is currently located. In some embodiments, the movement speed of the virtual object is related to complexity of the virtual environment in which the virtual object is currently located. In some embodiments, when the virtual environment in which the virtual object is located is the snowfield, the movement speed of the virtual object is reduced. In some embodiments, when the virtual environment in which the virtual object is located is the flat ground, the movement speed of the virtual object is significantly increased in comparison with the movement speed of the virtual object in the snowfield.

In the technical solutions provided in this embodiment of this application, the movement speed of the virtual object is determined based on both the attribute information of the sliding operation and the sensitivity of the trigger region, so that the technical solutions are more consistent with an actual situation, and enable the control on the virtual object by a user to be more fine and accurate.

Operation 360: Control the virtual object to move at the first movement speed.

In some embodiments, the method further includes at least one of the following operations (361 to 365, not shown in FIG. 8).

Operation 361: In response to a setting operation for the trigger region, display range frames respectively corresponding to the plurality of trigger regions.

In some embodiments, the user may set the trigger region before starting a round, or set the trigger region after starting the round. This is not limited in this application. A type of the setting operation is also not limited in this application. The setting operation may be a tap operation on the trigger region, or setting the trigger region by using another control. In response to the setting operation for the trigger region, the range frames respectively corresponding to the plurality of trigger regions are displayed. The range frames may be displayed in a highlight form or may be displayed in a form of an ordinary line. A specific display manner is not limited in this application.

Operation 362: In response to a deletion operation for a target trigger region of the plurality of trigger regions, cancel displaying of a range frame corresponding to the target trigger region.

In some embodiments, the user may perform a deletion operation on some unnecessary trigger regions. In the embodiment shown in FIG. 6, the user may perform a deletion operation on the trigger region Q6. In some embodiments, the user considers that practicability of the trigger region Q6 is not strong, the trigger region Q6 is unnecessary, and the trigger region Q6 may be deleted.

Operation 363: In response to an adjustment operation for the target trigger region of the plurality of trigger regions, adjust at least one of a size and a position of the range frame corresponding to the target trigger region.

In some embodiments, the user may adjust a size and a position of a range frame of a trigger region. In some embodiments, the user may adjust the size of the range frame of the trigger region through a first adjustment operation, for example, increase the size of the range frame. The user may adjust the position of the range frame of the trigger region through a second adjustment operation. In some embodiments, the user may drag the range frame to move the range frame to a needed position.

Operation 364: In response to an addition operation for the trigger region, display a range frame corresponding to a newly added trigger region.

In some embodiments, the user may add a trigger region and display a range frame corresponding to the newly added trigger region.

Operation 365: In response to a setting completion operation for the trigger region, set, based on sizes and positions of the currently displayed range frames corresponding to the trigger regions, the plurality of trigger regions corresponding to the joystick control.

In the technical solutions provided in this embodiment of this application, the size and the position of the range frame of the trigger region may be adjusted, and the trigger region may be added or deleted, so that the technical solutions can satisfy different user demands and are suitable for different groups of users. For a novice user, a small quantity of trigger regions with a large size may be disposed, to avoid a mistaken touch. For an experienced user, a large quantity of trigger regions with a small size may be disposed, to help to improve a skill of the experienced user in a round. Therefore, a possibility of human-computer interaction is improved, and user experience is better.

In some embodiments, the method further includes at least one of the following operations (366 to 368, not shown in FIG. 8).

Operation 366: Obtain real-time competitive data related to the virtual object, where the real-time competitive data includes at least one of the following: real-time attribute data of the virtual object, real-time environment data of the virtual object, real-time equipment data of the virtual object, and a real-time distance between a current position and an expected position that are of the virtual object.

In some embodiments, the real-time attribute data of the virtual object may be a current status of the virtual object, such as a health point, whether the virtual object is injured, or whether the virtual object continuously loses blood.

In some embodiments, the real-time environment data of the virtual object may be data of a real-time environment in which the virtual object is currently located, such as whether the virtual object is in a poisonous region, an unsafe swamp region, or a bomb-dropping region.

In some embodiments, the real-time equipment data of the virtual object may be data of equipment currently held by the virtual object, such as a quantity of virtual items, or a quantity of virtual arms and ammunition.

In some embodiments, the real-time distance between the current position and the expected position that are of the virtual object may be a distance between a position at which the virtual object is currently located and a position expected by the virtual object. The expected position may be marked by the user, or may be predicted by a server, for example, the expected position may be a center position of a safety region, or may be a target position marked by the user.

Operation 367: Determine a recommended trigger region from the plurality of trigger regions based on the real-time competitive data.

In some embodiments, the recommended trigger region is determined from the plurality of trigger regions based on the real-time competitive data. For example, when the health point of the virtual object is low, the equipment is poor, and the region at which the virtual object is located is unsafe, a trigger region with a highest sensitivity is determined from the plurality of trigger regions as the recommended trigger region. For example, when the health point of the virtual object is abundant and the equipment is good, a trigger region with a low sensitivity is determined from the plurality of trigger regions as the recommended trigger region. In some embodiments, the recommended trigger region is one of the plurality of trigger regions.

In some embodiments, the real-time competitive data is processed by using a speed prediction model, to predict and obtain an expected movement speed of the virtual object. The speed prediction model is a machine learning model constructed based on a neural network. The recommended trigger region is determined from the plurality of trigger regions based on the expected movement speed.

Operation 368: Display prompt information corresponding to the recommended trigger region.

In some embodiments, the prompt information is the joystick control, and the joystick control is displayed in the recommended trigger region of the plurality of trigger regions. In some embodiments, the joystick control is displayed at a reference point position of the recommended trigger region. In some embodiments, the reference point position is a center position of the recommended trigger region. In some embodiments, as shown in FIG. 5, a joystick control TO is displayed directly on the recommended trigger region of the user interface.

In some embodiments, the prompt information is the recommended trigger region, and the recommended trigger region of the plurality of trigger regions and a trigger region other than the recommended trigger region are displayed differently. For example, the recommended trigger region is displayed in the user interface in the highlight form. In some embodiments, as shown in FIG. 5, the trigger region Q3 is highlighted and displayed in the recommended trigger region of the user interface.

In the technical solutions provided in this embodiment of this application, the recommended trigger region is determined based on the real-time competitive data of the virtual object, so that the recommended trigger region can be provided based on a situation of the virtual object in real time. When the virtual object encounters a danger or is in an unsafe state, the user may directly use the recommended trigger region without being distracted by thinking about a trigger region that needs to be used, thereby reducing reaction duration of the user and improving battle experience of the user. In addition, accuracy and efficiency of selecting the trigger region may also be improved, so that the user can quickly and accurately select a trigger region suitable for a current battle scene, to control the virtual object to move at a speed suitable for the current battle scene.

Figure 9:
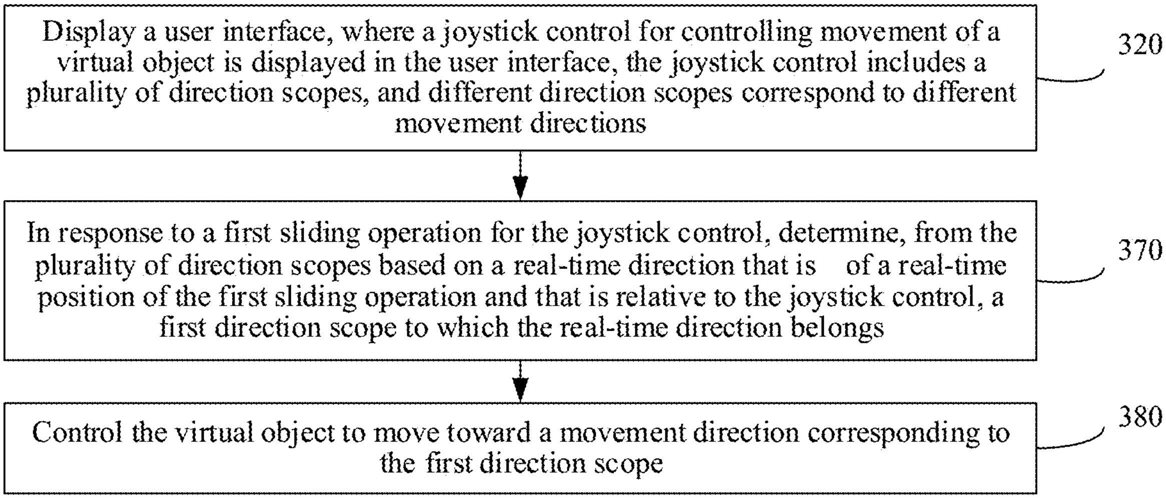
FIG. 9 is a flowchart of a method for controlling a virtual object according to another embodiment of this application.

FIG. 9 is a flowchart of a method for controlling a virtual object according to another embodiment of this application. An entity executing each operation of the method may be the terminal device 10 in the solution implementation environment shown in FIG. 1. For example, the entity executing each operation may be the client of the target application program. In the following method embodiments, for case of description, the entity executing each operation being a “client” is used for introduction and description. The method may include at least one of the following operations (320 to 380).

Operation 320: Display a user interface, where a joystick control for controlling movement of a virtual object is displayed in the user interface, the joystick control includes a plurality of direction scopes, and different direction scopes correspond to different movement directions.

Operation 370: In response to a first sliding operation for the joystick control, determine, from the plurality of direction scopes based on a real-time direction that is of a real-time position of the first sliding operation and that is relative to the joystick control, a first direction scope to which the real-time direction belongs.

In the technical solutions provided in this embodiment of this application, not only a movement speed of the virtual object can be determined based on a sensitivity of a target trigger region corresponding to a start position of a sliding operation, but also the first direction scope to which the real-time direction belongs can be determined from the plurality of direction scopes based on the real-time direction that is of the real-time position of the sliding operation and that is relative to the joystick control.

A quantity of direction scopes is not limited in this application. In some embodiments, the quantity of direction scopes is eight.

Figure 10:
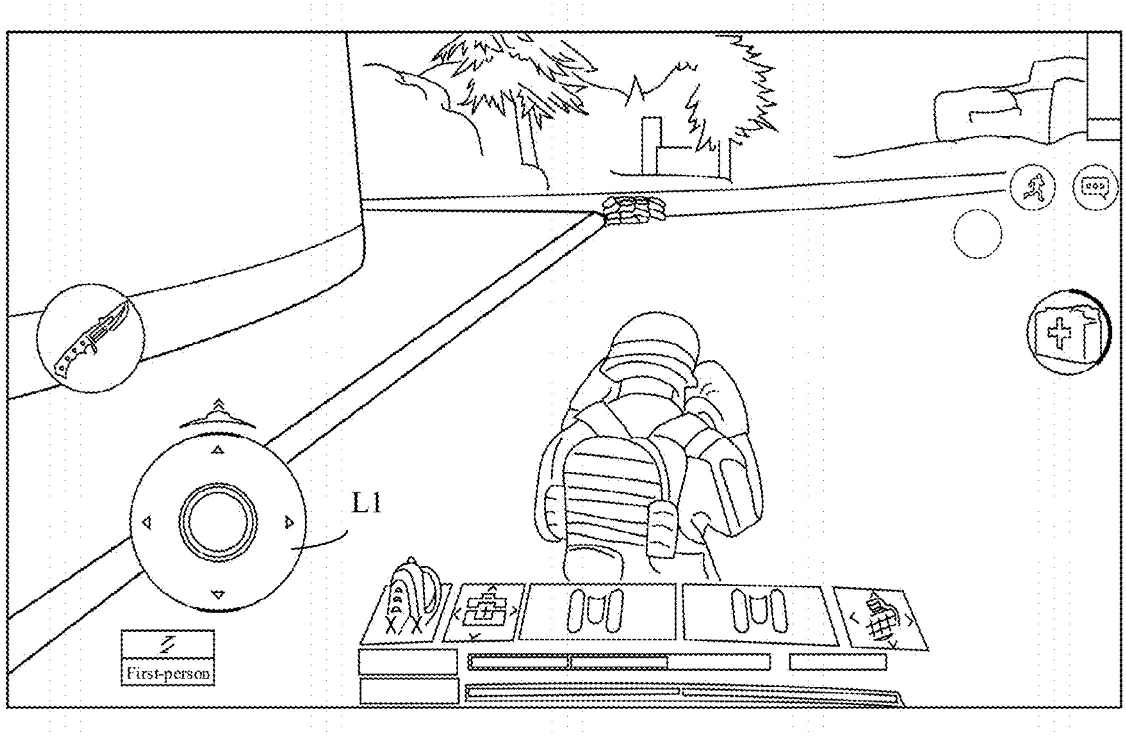
FIG. 10 is a schematic diagram of a user interface according to another embodiment of this application.
Figure 11:
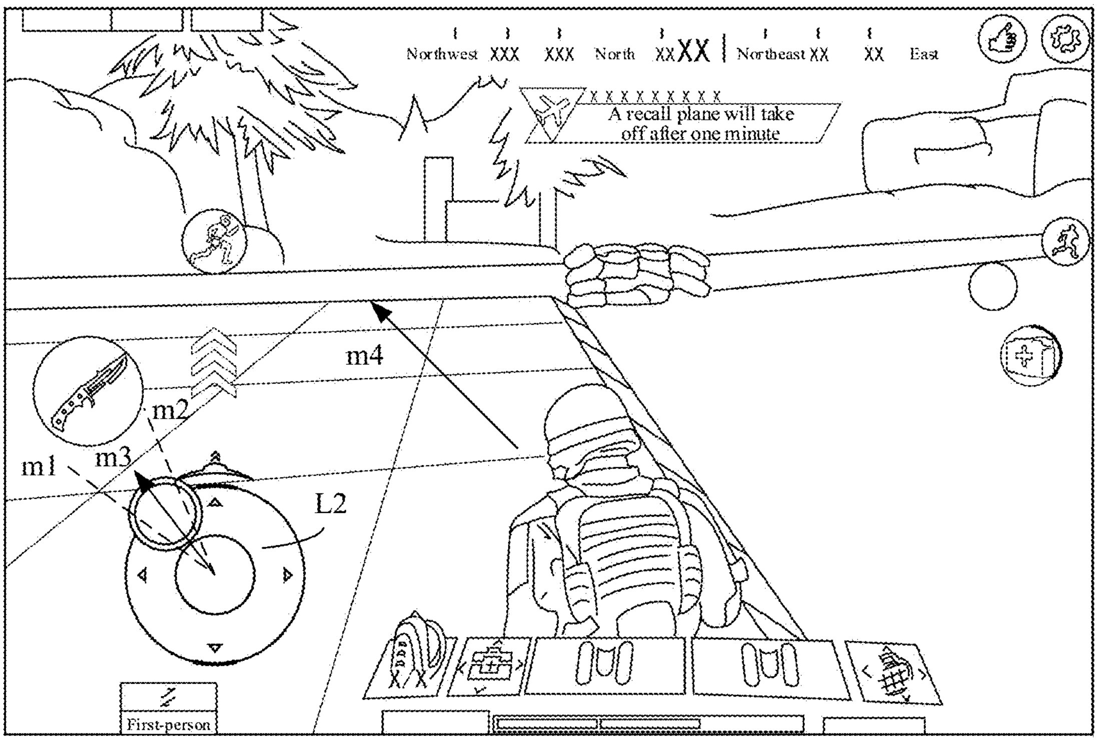
FIG. 11 is a schematic diagram of a user interface according to another embodiment of this application.

In some embodiments, in a schematic diagram of a user interface shown in FIG. 10, a first direction scope to which a real-time direction that is of a real-time position of a first sliding operation of a user and that is relative to a joystick control L1 belongs is determined from a plurality of direction scopes based on the real-time direction. In some embodiments, ten direction scopes may be divided in FIG. 10. For example, an upper half scope may be divided into five direction scopes, which are an upper direction scope, an upper-left direction scope, an upper-right direction scope, a left direction scope, and a right direction scope. In some embodiments, each direction scope corresponds to a range. In some embodiments, as shown in FIG. 11, a real-time direction that is of a real-time position of a first sliding operation and that is relative to a joystick control L2 is a direction pointed by an arrow m3. The direction of m3 falls in a direction scope enclosed by m1 and m2, so that the “upper left” direction scope enclosed by m1 and m2 is determined as a first direction scope. A direction 45 degrees north by west of the direction corresponding to the first direction scope is determined as a movement direction of a virtual object. A movement direction that is of the virtual object and that is pointed by an arrow m4 is the direction 45 degrees north by west.

Figure 12:
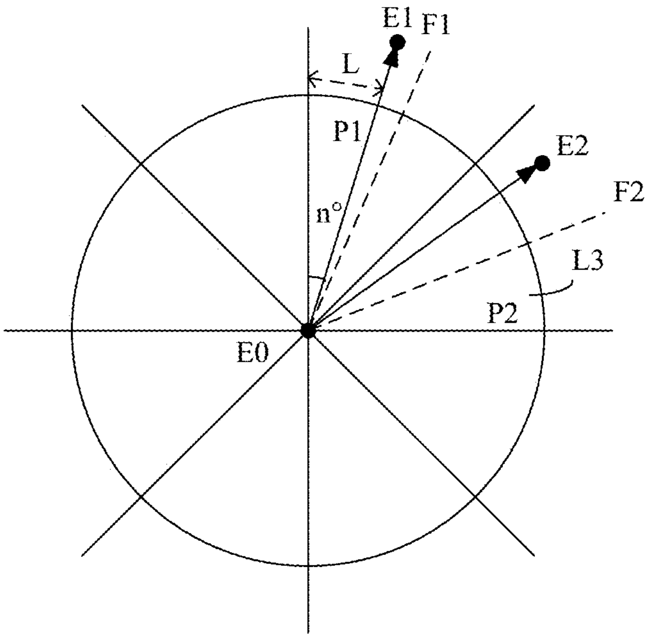
FIG. 12 is a schematic diagram of a user interface according to another embodiment of this application.

Specifically, a schematic diagram of a joystick control shown in FIG. 12 is used as an example. There are eight direction scopes in total. A real-time position of a first sliding operation is E1, a center position of a joystick control L3 is E0, and a real-time direction that is of the real-time position of the first sliding operation and that is relative to the joystick control is a direction pointing to E1 from E0. It may be determined that the direction pointing to E1 from E0 belongs to a direction scope P1 (where P1 corresponds to one of the eight direction scopes, that is, an upper-right direction scope).

In some embodiments, a method for determining the first direction scope to which the real-time direction that is of the real-time position of the first sliding operation and that is relative to the joystick control belongs is provided.

A quantity of pixels for which a user slides on a screen may be obtained based on a sliding operation of the user, and an arc length of the sliding may further be obtained. It is assumed that the known arc length of the sliding is 5 mm. An arc length formula is L=n*π*r/180, and L=α*r. n is a degree of a central angle, r is a radius, and L is an arc length of the central angle. In a circle whose radius is R, because an arc length subtended by a 360° central angle is equal to a circumference C=2πr, an arc length subtended by an n° central angle is L=n°*πr/180° (L=n°*2πr/360°). An arc length of a sector is essentially a segment of a side length of a circle. When an angle of the sector is a proportion of 360 degrees, the arc length of the sector is the proportion of a circumference of the circle. Therefore, it can be learned that the arc length of the sector=2πr*angle/360, where 2πr is the circumference of the circle and the angle is an angle value of the sector. For example, a central angle subtended by an arc with a radius of 1 cm and a length of 0.785 cm can be calculated based on the following formula. L=nπr/180=n*π*1/180=n*3.14*1/180=0.785. Therefore, n=45 degrees. In other words, the central angle subtended by the arc is 45 degrees.

Based on the foregoing descriptions, the central angle is determined based on the arc length, and the first direction scope to which the real-time direction that is of the real-time position of the first sliding operation and that is relative to the joystick control belongs is further determined. Therefore, a specific value of n° can be obtained through inverse calculation based on an arc length L corresponding to the central angle of n° in FIG. 12, and the belonging direction scope is determined based on the value of n°. In some embodiments, the value of n is 75. In this case, the first direction scope of the real-time direction that is of the real-time position of the first sliding operation and that is relative to the joystick control is P2.

Operation 380: Control the virtual object to move toward a movement direction corresponding to the first direction scope.

In some embodiments, a movement direction corresponding to each direction scope is set. In some embodiments, a center direction of each direction scope serves as the movement direction corresponding to the direction scope. In FIG. 12, a movement direction corresponding to the direction scope P1 is a direction pointing to F1 from E0, where F1 is a point in the center direction of the direction scope P1.

When the direction scope to which the real-time direction belongs changes from the first direction scope to a second direction scope, the movement direction of the virtual object is controlled to gradually change, within first duration, from the movement direction corresponding to the first direction scope to a movement direction corresponding to the second direction scope. The second direction scope is a direction scope adjacent to the first direction scope. The direction is gradually adjusted, so that the direction of the virtual object does not change instantaneously. Therefore, user experience is better.

In FIG. 12, when the real-time position of the sliding operation changes from E1 to E2, the direction scope changes from P1 to P2. The movement direction of the virtual object is controlled to gradually change from the direction pointing to F1 from E0 to a direction pointing to F2 from E0, where the direction pointing to F2 from E0 is a movement direction corresponding to the direction scope P2.

A sequence of the operations described in the embodiments is not limited in this application, and all the operations may be arranged and combined to form a new embodiment.

In the technical solutions provided in this embodiment of this application, the plurality of direction scopes are divided to prevent the virtual object controlled by the user from changing a direction excessively sensitively. In addition, the plurality of direction scopes are set and each direction scope corresponds to one movement direction, so that processing overheads of a terminal device can be reduced to a large extent. In some embodiments, when a battle picture is frozen, the movement direction of the virtual object is set to one of the movement directions corresponding to the plurality of direction scopes set in this embodiment of this application, so that running costs of the terminal device can be reduced, and the picture can be less frozen. Therefore, smoothness of the picture is good and the user experience is good.

Figure 13:
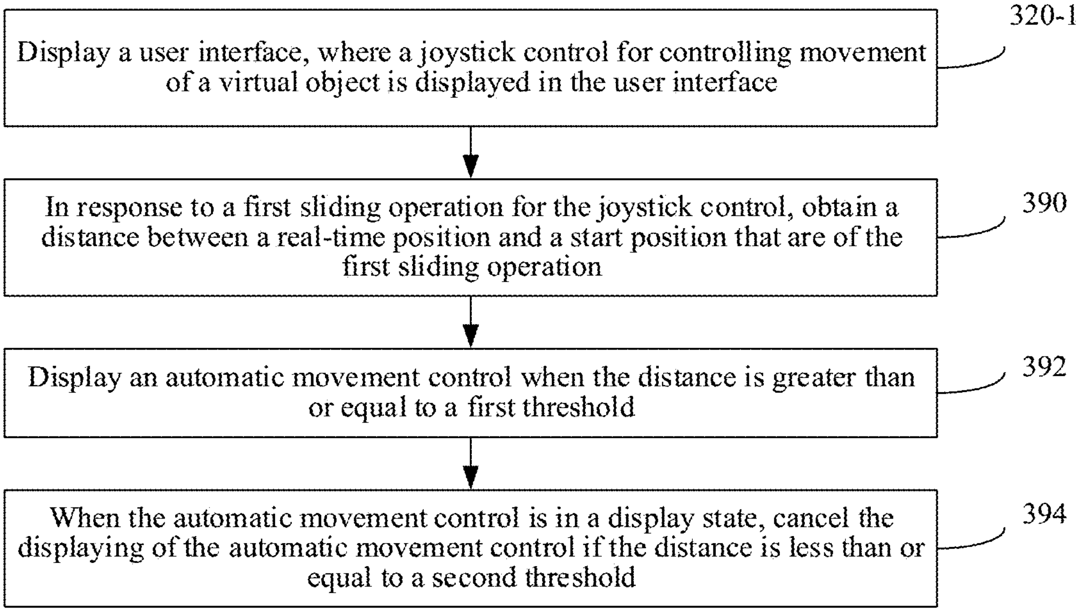
FIG. 13 is a flowchart of a method for controlling a virtual object according to another embodiment of this application.

FIG. 13 is a flowchart of a method for controlling a virtual object according to another embodiment of this application. An entity executing each operation of the method may be the terminal device 10 in the solution implementation environment shown in FIG. 1. For example, the entity executing each operation may be the client of the target application program. In the following method embodiments, for ease of description, the entity executing each operation being a "client" is used for introduction and description. The method may include at least one of the following operations (320-1 to 394).

Operation 320-1: Display a user interface, where a joystick control for controlling movement of a virtual object is displayed in the user interface.

Operation 390: In response to a first sliding operation for the joystick control, obtain a distance between a real-time position and a start position that are of the first sliding operation.

Figure 14:
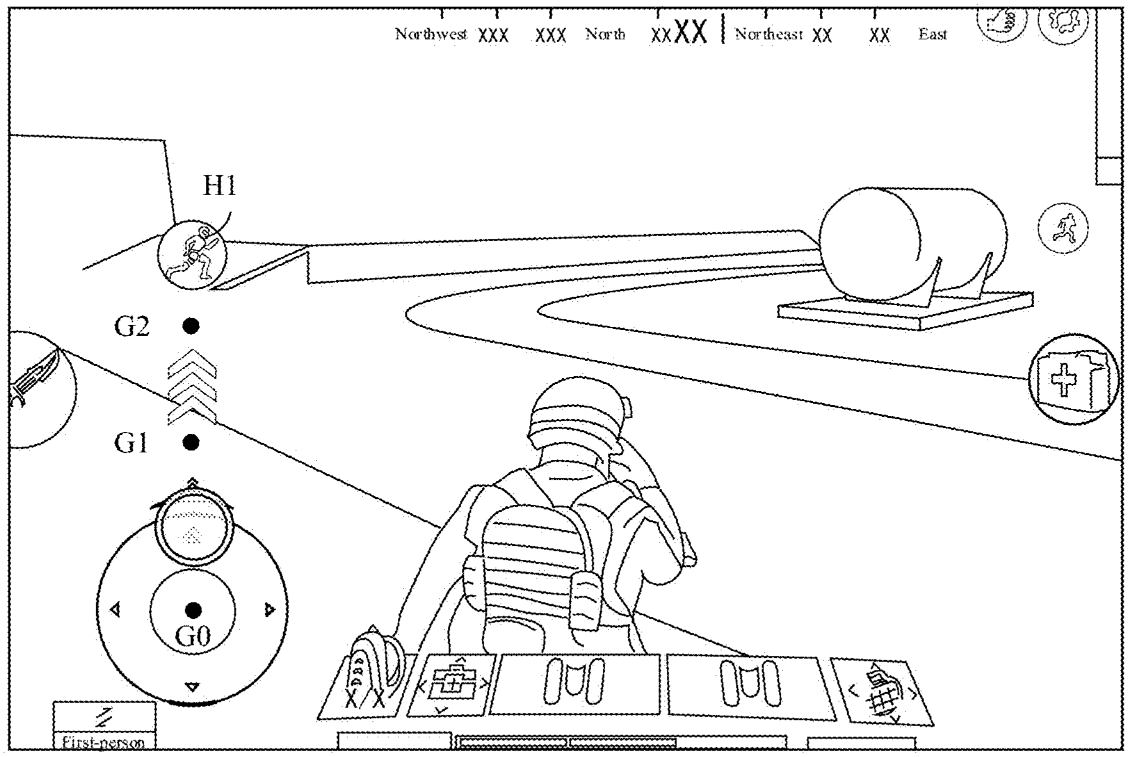
FIG. 14 is a schematic diagram of a user interface according to another embodiment of this application.

In some embodiments, as shown in FIG. 14, when the real-time position of the first sliding operation is G1, the distance between the real-time position and the start position that are of the first sliding operation is a distance between G1 and a start position G0 of the first sliding operation.

Operation 392: Display an automatic movement control when the distance is greater than or equal to a first threshold.

The automatic movement control is configured to enable the virtual object to move automatically. In FIG. 14, when the real-time position of the first sliding operation is G1, the distance between the real-time position and the start position that are of the first sliding operation is the distance between G1 and the start position G0 of the first sliding operation. The distance is less than the first threshold, and the automatic movement control is not displayed. When the real-time position of the first sliding operation changes from G1 to G2, the distance between the real-time position and the start position that are of the first sliding operation is a distance between G2 and the start position G0 of the first sliding operation. The distance is greater than or equal to the first threshold, and an automatic movement control H1 is displayed.

Operation 394: When the automatic movement control is in a display state, cancel the displaying of the automatic movement control if the distance is less than or equal to a second threshold.

Figure 15:
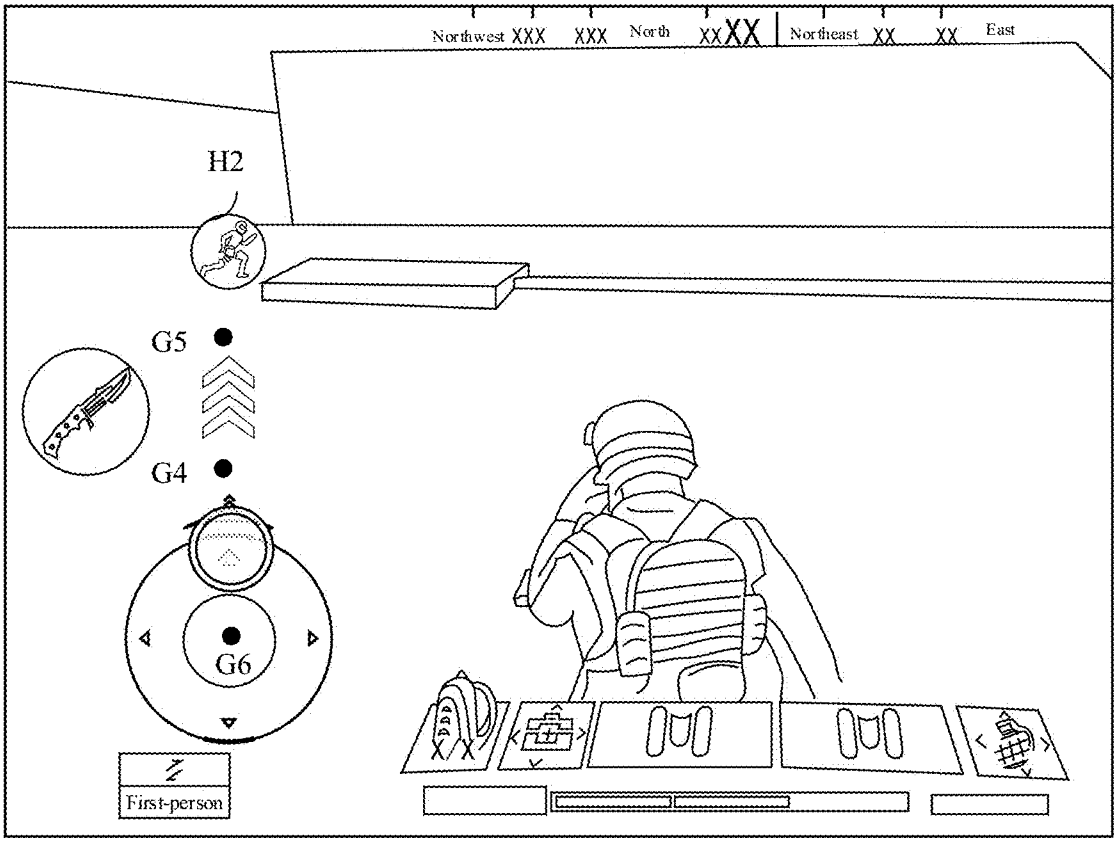
FIG. 15 is a schematic diagram of a user interface according to another embodiment of this application.

In FIG. 15, when the real-time position of the first sliding operation is G5, the distance between the real-time position and the start position that are of the first sliding operation is a distance between G5 and a start position G6 of the first sliding operation. The distance is greater than or equal to the first threshold, and an automatic movement control H2 is displayed. When the real-time position of the first sliding operation changes from G5 to G4, the distance between the real-time position and the start position that are of the first sliding operation is a distance between G4 and the start position G6 of the first sliding operation. The distance is less than or equal to the second threshold, and the displaying of the automatic movement control H2 is cancelled.

Values of the first threshold and the second threshold are not limited in this embodiment of this application. When the distance between the real-time position and the start position that are of the first sliding operation is greater than or equal to the first threshold, the automatic movement control is displayed. When the distance between the real-time position and the start position that are of the first sliding operation is less than or equal to the second threshold, the displaying of the automatic movement control is cancelled. In this way, constant disappearance and appearance of the automatic movement control due to many times of operations of a user can be avoided, thereby improving user experience and alleviating a processing pressure of the terminal device.

Figure 16:
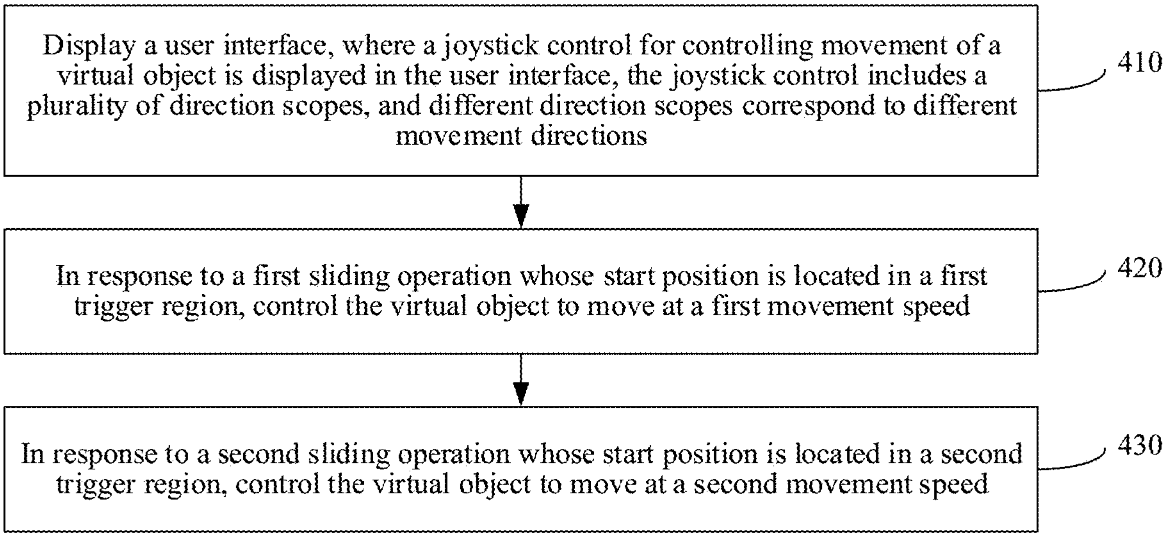
FIG. 16 is a flowchart of a method for controlling a virtual object according to another embodiment of this application.

FIG. 16 is a flowchart of a method for controlling a virtual object according to another embodiment of this application. An entity executing each operation of the method may be the terminal device 10 in the solution implementation environment shown in FIG. 1. For example, the entity executing each operation may be the client of the target application program. In the following method embodiments, for ease of description, the entity executing each operation being a "client" is used for introduction and description. The method may include at least one of the following operations (410 to 430).

Operation 410: Display a user interface, where a joystick control for controlling movement of a virtual object is displayed in the user interface, the joystick control includes a plurality of trigger regions, and different trigger regions correspond to different sensitivities.

Operation 420: In response to a first sliding operation whose start position is located in a first trigger region, control the virtual object to move at a first movement speed.

Operation 430: In response to a second sliding operation whose start position is located in a second trigger region, control the virtual object to move at a second movement speed.

The first trigger region and the second trigger region are respectively one of the plurality of trigger regions. The first trigger region is different from the second trigger region. The first movement speed is different from the second movement speed.

Figure 17:
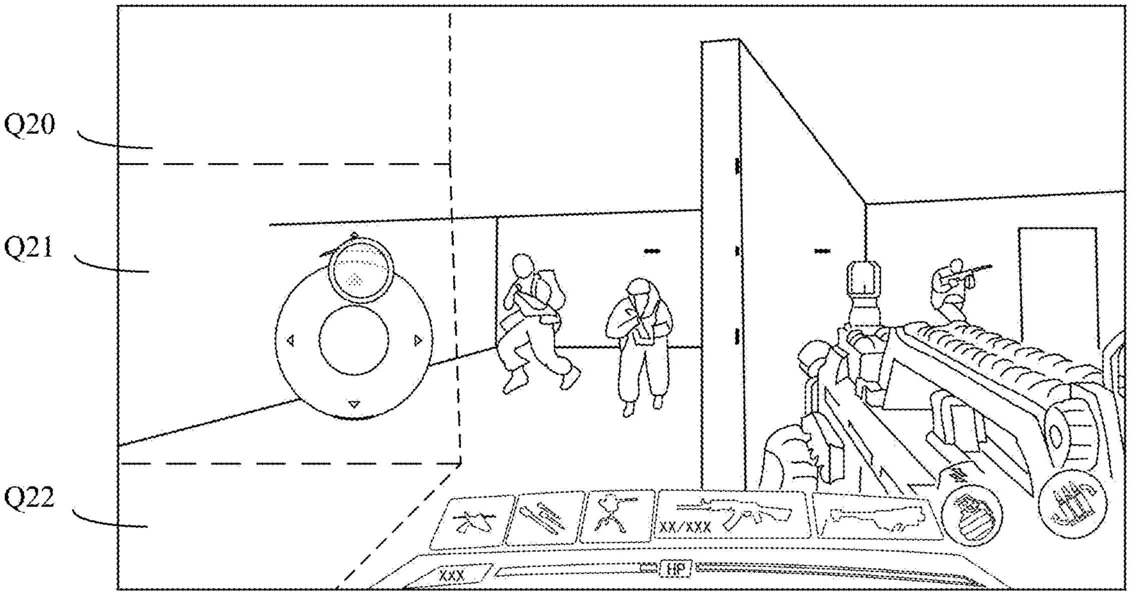
FIG. 17 is a schematic diagram of a user interface according to another embodiment of this application.

In a user interface shown in FIG. 17, in response to a sliding operation whose start position is located in a trigger region Q22, the virtual object is controlled to move at a low speed. In response to a sliding operation whose start position is located in a trigger region Q21, the virtual object is controlled to move at a medium speed. In response to a sliding operation whose start position is located in a trigger region Q20, the virtual object is controlled to move at a high speed. As shown in FIG. 17, when a virtual object of an enemy camp appears in a virtual environment, the virtual object (of an ally camp) needs to be controlled to move at the medium speed, so that the start position of the sliding operation may fall in the trigger region Q21, to enable the virtual object of the ally camp to more easily target the virtual object of the enemy camp. When the virtual object needs to be controlled to move quickly, for example, to flee from a poisonous region, the start position of the sliding operation may fall in the trigger region Q20, to control the virtual object to move at the high speed. When the virtual object crawls and moves, the start position of the sliding operation may fall in the trigger region Q22, to control the virtual object to move at the low speed.

In some embodiments, in response to the first sliding operation, the joystick control is displayed at the start position of the first sliding operation. For details, refer to the foregoing embodiments, and details are not described herein.

In some embodiments, in response to a setting operation for the trigger region, range frames respectively corresponding to the plurality of trigger regions are displayed; in response to a deletion operation for a target trigger region of the plurality of trigger regions, displaying of a range frame corresponding to the target trigger region is cancelled; or in response to an adjustment operation for the target trigger region of the plurality of trigger regions, at least one of a size and a position of the range frame corresponding to the target trigger region is adjusted; or in response to an addition operation for the trigger region, a range frame corresponding to a newly added trigger region is displayed; and in response to a setting completion operation for the trigger region, the plurality of trigger regions corresponding to the joystick control are set based on sizes and positions of the currently displayed range frames corresponding to the trigger regions. For details, refer to the foregoing embodiments, and details are not described herein.

In some embodiments, no overlapping region exists between any two of the plurality of trigger regions; or an overlapping region exists between at least two of the plurality of trigger regions. For details, refer to the foregoing embodiments, and details are not described herein.

In some embodiments, the joystick control is displayed in a recommended trigger region of the plurality of trigger regions; or the recommended trigger region of the plurality of trigger regions and a trigger region other than the recommended trigger region are displayed differently. For details, refer to the foregoing embodiments, and details are not described herein.

The operations described in this embodiment of this application are not limited to the embodiments listed in this application, but the operations can be combined with each other to form a new embodiment. This is not limited in this application.

In the technical solutions provided in this embodiment of this application, the virtual object may be controlled to move at different movement speeds for the sliding operations in different trigger regions, so that the control on the virtual object by the user can be refined, and different demands of the user for different situations can be satisfied.

Figure 18:
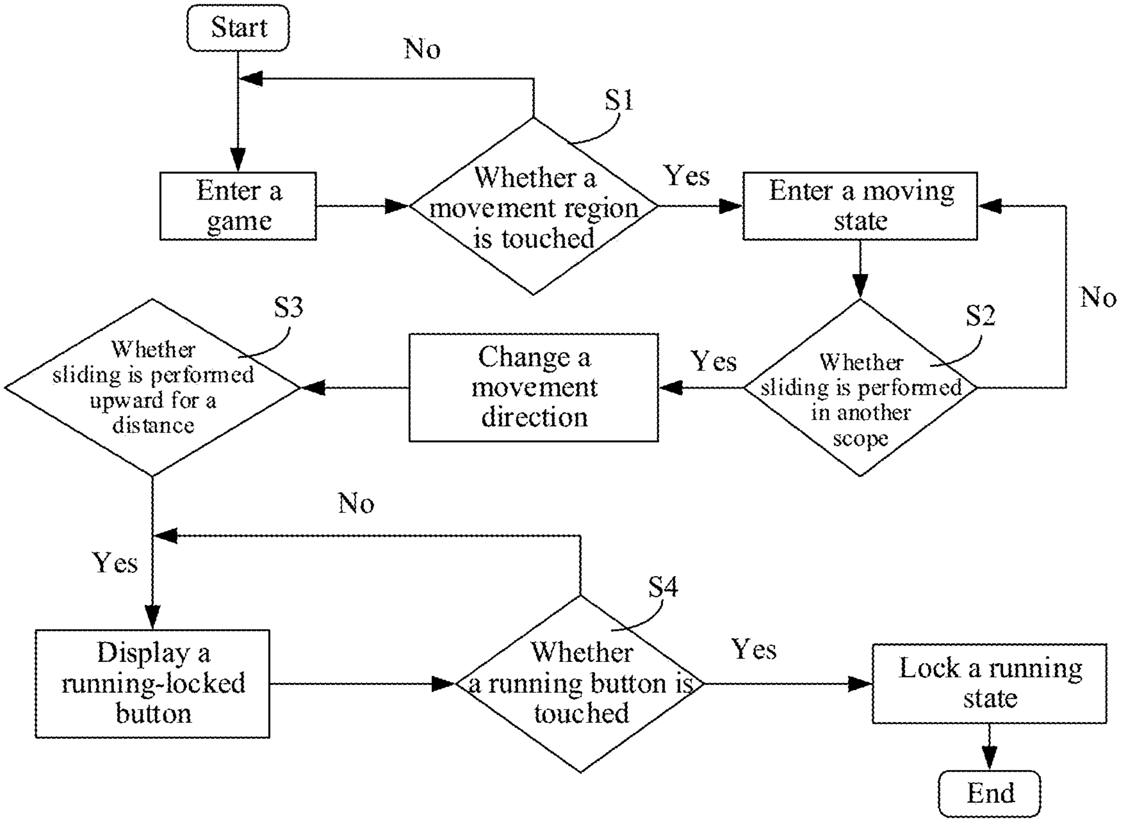
FIG. 18 is a flowchart of a method for controlling a virtual object according to another embodiment of this application.

FIG. 18 is a flowchart of a method for controlling a virtual object according to another embodiment of this application. An entity executing each operation of the method may be the terminal device 10 in the solution implementation environment shown in FIG. 1. For example, the entity executing each operation may be the client of the target application program. In the following method embodiments, for ease of description, the entity executing each operation being a "client" is used for introduction and description. The method may include at least one of the following operations (S1 to S4).

After a game round is started, the game round is entered and an operation S1 is performed.

Operation S1: Determine whether a movement region is touched, and if yes, enter a moving state; or if no, reenter the game round.

After the moving state is entered, an operation S2 is performed.

Operation S2: Determine whether sliding is performed in another scope, and if yes, change a movement direction; or if no, reenter the moving state.

After the moving state changes, an operation S3 is performed.

Operation S3: Determine whether sliding is performed upward for a distance, and if yes, display a running-locked button.

Operation S4: Determine whether a running button is touched, and if yes, lock a running state; or if no, continue to display the running-locked button.

The game round ends.

Apparatus embodiments of this application are described below, and may be used to perform the method embodiments of this application. For details not disclosed in the apparatus embodiments of this application, refer to the method embodiments of this application.

Figure 19:
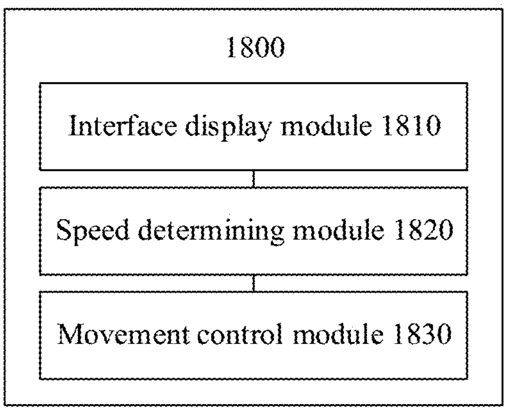
FIG. 19 is a block diagram of an apparatus for controlling a virtual object according to an embodiment of this application.

FIG. 19 is a block diagram of an apparatus for controlling a virtual object according to an embodiment of this application. The apparatus has a function of implementing the foregoing method examples. The function may be implemented by hardware, or may be implemented by hardware executing corresponding software. The apparatus may be the foregoing described terminal device, or may be disposed in the terminal device. As shown in FIG. 19, the apparatus 1800 may include: an interface display module 1810, a speed determining module 1820, and a movement control module 1830.

The interface display module 1810 is configured to display a user interface, where a joystick control for controlling movement of a virtual object is displayed in the user interface, the joystick control includes a plurality of trigger regions, and different trigger regions correspond to different sensitivities.

The speed determining module 1820 is configured to: in response to a first sliding operation whose start position is located in a first trigger region, determine a first movement speed of the virtual object based on a sensitivity of the first trigger region.

The movement control module 1830 is configured to control the virtual object to move at the first movement speed.

In some embodiments, the speed determining module 1820 is configured to determine the first movement speed of the virtual object based on the sensitivity of the first trigger region and attribute information of the first sliding operation, where the first trigger region is one of the plurality of trigger regions.

In some embodiments, the attribute information includes a distance between a real-time position and the start position that are of the first sliding operation.

In some embodiments, the speed determining module 1820 is further configured to determine a sensitivity correction parameter based on the distance, where the sensitivity correction parameter is configured for adjusting the sensitivity of the trigger region.

The speed determining module 1820 is further configured to determine the first movement speed of the virtual object based on the sensitivity correction parameter and the sensitivity of the first trigger region.

In some embodiments, an overlapping region exists between at least two of the plurality of trigger regions.

Figure 20:
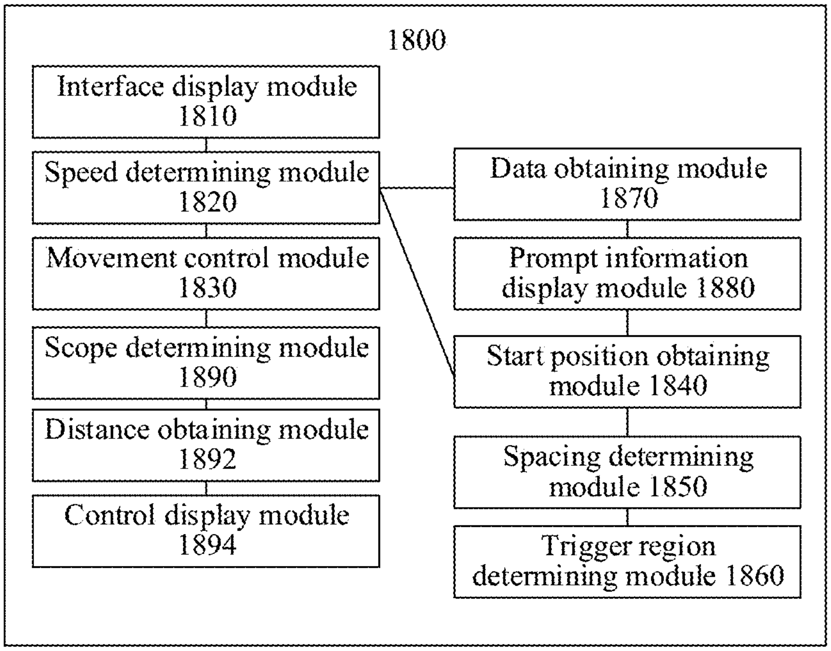
FIG. 20 is a block diagram of an apparatus for controlling a virtual object according to another embodiment of this application.

In some embodiments, as shown in FIG. 20, the apparatus further includes a start position obtaining module 1840, a spacing determining module 1850, and a trigger region determining module 1860.

The start position obtaining module 1840 is configured to obtain the start position of the first sliding operation when the first sliding operation is detected.

The spacing determining module 1850 is configured to determine a spacing between the start position of the first sliding operation and a reference point of each of the trigger regions, where positions of reference points of the trigger regions are different from each other.

The trigger region determining module 1860 is configured to determine, from the plurality of trigger regions, a trigger region having a smallest spacing as the first trigger region.

In some embodiments, as shown in FIG. 20, the apparatus further includes a data obtaining module 1870 and a prompt information display module 1880.

The data obtaining module 1870 is configured to obtain real-time competitive data related to the virtual object, where the real-time competitive data includes at least one of the following: real-time attribute data of the virtual object, real-time environment data of the virtual object, real-time equipment data of the virtual object, and a real-time distance between a current position and an expected position that are of the virtual object.

The trigger region determining module 1860 is further configured to determine a recommended trigger region from the plurality of trigger regions based on the real-time competitive data.

The prompt information display module 1880 is configured to display prompt information corresponding to the recommended trigger region.

In some embodiments, the trigger region determining module 1860 is further configured to process the real-time competitive data by using a speed prediction model, to predict and obtain an expected movement speed of the virtual object, where the speed prediction model is a machine learning model constructed based on a neural network.

The trigger region determining module 1860 is further configured to determine the recommended trigger region from the plurality of trigger regions based on the expected movement speed.

In some embodiments, positions of the plurality of trigger regions are arranged in ascending or descending order of sensitivities respectively corresponding to the plurality of trigger regions.

In some embodiments, the joystick control includes a plurality of direction scopes, and different direction scopes correspond to different movement directions.

In some embodiments, as shown in FIG. 20, the apparatus further includes a scope determining module 1890.

The scope determining module 1890 is configured to determine, from the plurality of direction scopes based on a real-time direction that is of a real-time position of the first sliding operation and that is relative to the joystick control, a first direction scope to which the real-time direction belongs.

The movement control module 1830 is further configured to control the virtual object to move toward a movement direction corresponding to the first direction scope.

In some embodiments, the movement control module 1830 is further configured to: when a direction scope to which the real-time direction belongs changes from the first direction scope to a second direction scope, control the movement direction of the virtual object to gradually change, within first duration, from the movement direction corresponding to the first direction scope to a movement direction corresponding to the second direction scope, where the second direction scope is a direction scope adjacent to the first direction scope.

In some embodiments, as shown in FIG. 20, the apparatus further includes a distance obtaining module 1892 and a control display module 1894.

The distance obtaining module 1892 is configured to obtain the distance between the real-time position and the start position that are of the first sliding operation.

The control display module 1894 is configured to: when the distance is greater than or equal to a first threshold, display an automatic movement control, where the automatic movement control is configured to trigger automatic running of the virtual object.

The control display module 1894 is further configured to: when the automatic movement control is in a display state, cancel the displaying of the automatic movement control if the distance is less than or equal to a second threshold, where the second threshold is less than the first threshold.

In some embodiments, the interface display module 1810 is configured to display the user interface, where the joystick control for controlling the movement of the virtual object is displayed in the user interface, and the joystick control includes the plurality of trigger regions.

The movement control module 1830 is configured to: in response to the first sliding operation whose start position is located in the first trigger region, control the virtual object to move at the first movement speed.

The movement control module 1830 is further configured to: in response to a second sliding operation whose start position is located in a second trigger region, control the virtual object to move at a second movement speed, where the first trigger region and the second trigger region are respectively one of the plurality of trigger regions, the first trigger region is different from the second trigger region, and the first movement speed is different from second movement speed.

Figure 21:
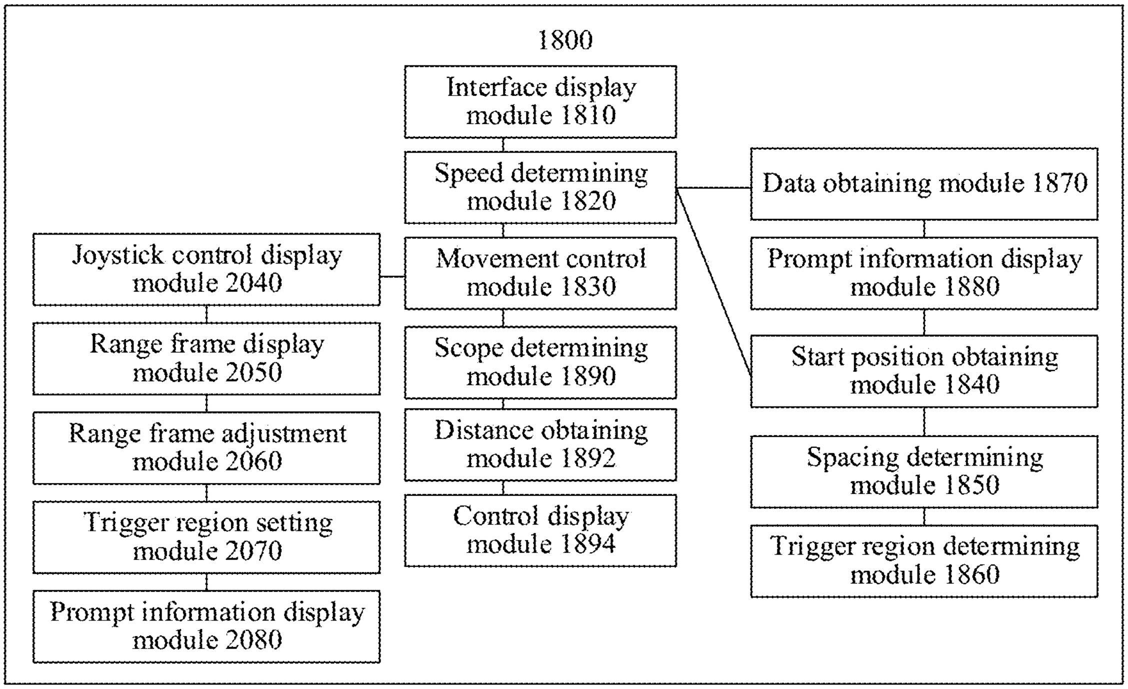
FIG. 21 is a block diagram of an apparatus for controlling a virtual object according to another embodiment of this application.

In some embodiments, as shown in FIG. 21, the apparatus further includes a joystick control display module 2040.

The joystick control display module 2040 is configured to: in response to the first sliding operation, display the joystick control at the start position of the first sliding operation.

In some embodiments, as shown in FIG. 21, the apparatus further includes a range frame display module 2050, a range frame adjustment module 2060, and a trigger region setting module 2070.

The range frame display module 2050 is configured to: in response to a setting operation for the trigger region, display range frames respectively corresponding to the plurality of trigger regions.

The range frame display module 2050 is further configured to: in response to a deletion operation for a target trigger region of the plurality of trigger regions, cancel displaying of a range frame corresponding to the target trigger region.

The range frame adjustment module 2060 is configured to: in response to an adjustment operation for the target trigger region of the plurality of trigger regions, adjust at least one of a size and a position of the range frame corresponding to the target trigger region.

The range frame display module 2050 is further configured to: in response to an addition operation for the trigger region, display a range frame corresponding to a newly added trigger region.

The trigger region setting module 2070 is configured to: in response to a setting completion operation for the trigger region, set, based on sizes and positions of the currently displayed range frames corresponding to the trigger regions, the plurality of trigger regions corresponding to the joystick control.

In some embodiments, no overlapping region exists between any two of the plurality of trigger regions; or the overlapping region exists between at least two of the plurality of trigger regions.

In some embodiments, as shown in FIG. 21, the apparatus further includes a prompt information display module 2080.

The prompt information display module 2080 is configured to display the joystick control in the recommended trigger region of the plurality of trigger regions; or the prompt information display module 2080 is configured to differently display the recommended trigger region of the plurality of trigger regions and a trigger region other than the recommended trigger region.

When the apparatus provided in the foregoing embodiment implements the functions thereof, merely division of the foregoing function modules is used as an example for description. In an actual application, the functions may be allocated to and completed by different function modules based on needs. That is, an internal structure of a device is divided into the different function modules, to complete all or some of the functions described above. In addition, the apparatus provided in the foregoing embodiment and the method embodiments fall within a same concept. For details of a specific implementation process, refer to the method embodiments, and details are not described herein again.

Figure 22:
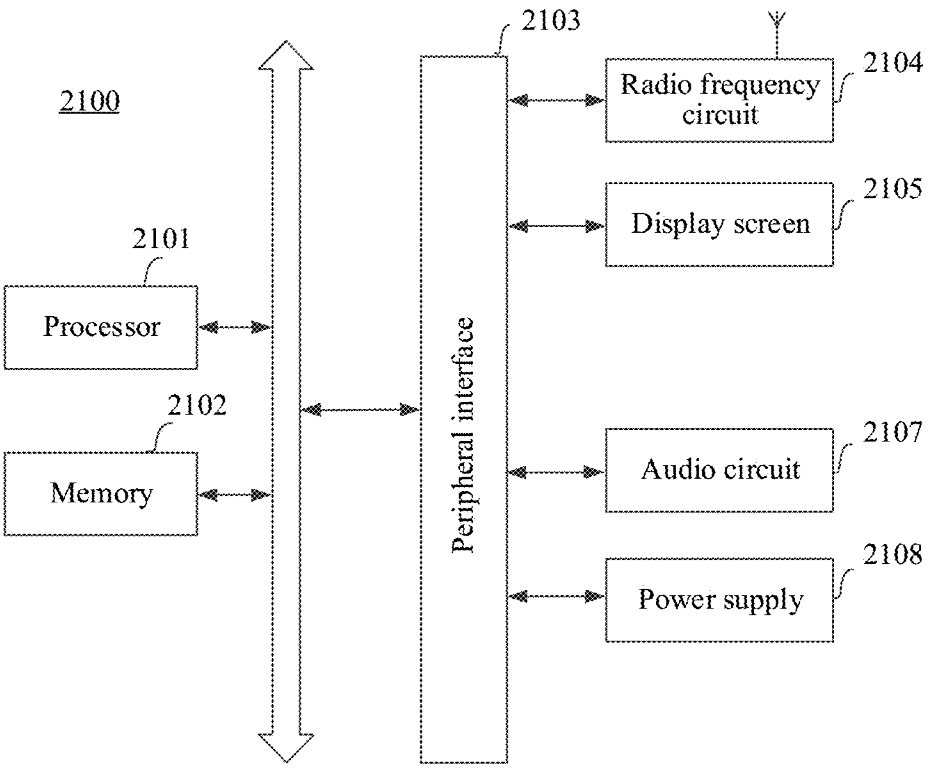
FIG. 22 is a block diagram of a structure of a terminal device according to an embodiment of this application.

FIG. 22 is a block diagram of a structure of a terminal device 2100 according to an embodiment of this application. The terminal device 2100 may be the terminal device 10 in the implementation environment shown in FIG. 1, and is configured to perform the method for controlling a virtual object provided in the foregoing embodiments. Details are as follows.

Generally, the terminal device 2100 includes a processor 2101 and a memory 2102.

The processor 2101 may include one or more processing cores, for example, a 4-core processor or an 8-core processor. The processor 2101 may be implemented in at least one hardware form of a digital signal processor (DSP), a field programmable gate array (FPGA), and a programmable logic array (PLA).

The memory 2102 may include one or more computer-readable storage media. The computer-readable storage medium may be non-transient. The memory 2102 may further include a high-speed random access memory and a nonvolatile memory, for example, one or more disk storage devices or flash storage devices. In some embodiments, the non-transient computer-readable storage medium in the memory 2102 is configured to store a computer program. The computer program is configured to be executed by one or more processors to implement the foregoing method for controlling a virtual object.

In some embodiments, the terminal device 2100 may further include: a peripheral interface 2103 and at least one peripheral. The processor 2101, the memory 2102, and the peripheral interface 2103 may be connected through a bus or a signal cable. Each peripheral may be connected to the peripheral interface 2103 through the bus, the signal cable, or a circuit board. Specifically, the peripheral includes at least one of a radio frequency circuit 2104, a display screen 2105, an audio circuit 2107, and a power supply 2108.

A person skilled in the art may understand that the structure shown in FIG. 22 does not constitute a limitation to the terminal device 2100, and the terminal device may include more or fewer components than those shown in the figure, or some components may be combined, or a different component deployment may be used.

In some embodiments, a non-transitory computer-readable storage medium is further provided. The storage medium has a computer program stored therein, and the computer program is executed by a processor to implement the foregoing method for controlling a virtual object.

In some embodiments, the computer-readable storage medium may include a read-only memory (ROM), a random access memory (RAM), a solid-state drive (SSD), an optical disc, or the like. The random access memory may include a resistive random access memory (ReRAM) and a dynamic random access memory (DRAM).

In some embodiments, a computer program product is further provided. The computer program product includes computer instructions, and the computer instructions are stored in a computer-readable storage medium. A processor of a terminal device reads the computer instructions from the computer-readable storage medium, and the processor executes the computer instructions to enable the terminal device to perform the foregoing method for controlling a virtual object.

What is claimed is:

1. A method for controlling a virtual object in a virtual environment performed by a computer device, the method comprising:

displaying a joystick control for controlling movement of the virtual object in the virtual environment, the joystick control comprising a plurality of trigger regions, each trigger regions having a unique sensitivity;

detecting a first sliding operation on a screen of the computer device whose start position is located in a first trigger region of the plurality of trigger regions;

determining a first movement speed of the virtual object based on a sensitivity of the first trigger region; and controlling the virtual object to move at the first movement speed;

obtaining a distance between a real-time position of the first sliding operation and the start position of the first sliding operation;

when the distance is greater than or equal to a first threshold, displaying an automatic movement control initiated by the first sliding operation on the screen of the computer device, wherein the automatic movement control is configured to trigger automatic running of the virtual object after a termination of the first sliding operation; and after determining that the automatic movement control initiated by the first sliding operation is in a display state, canceling the displaying of the automatic movement control when the distance is less than or equal to a second threshold, wherein the second threshold is less than the first threshold and the running of the virtual object stops after the termination of the first sliding operation.

2. The method according to claim 1, wherein the determining a first movement speed of the virtual object based on a sensitivity of the first trigger region comprises:

determining the first movement speed of the virtual object based on the sensitivity of the first trigger region and a distance between a real-time position and the start position that are of the first sliding operation.

3. The method according to claim 1, wherein an overlapping region exists between at least two of the plurality of trigger regions, and the method further comprises:

determining a distance between the start position of the first sliding operation and a reference point of each of the trigger regions; and determining, from the plurality of trigger regions, a trigger region having a smallest distance as the first trigger region.

4. The method according to claim 1, wherein the method further comprises:

obtaining real-time competitive data related to the virtual object;

determining a recommended trigger region from the plurality of trigger regions based on the real-time competitive data; and displaying prompt information corresponding to the recommended trigger region.

5. The method according to claim 1, wherein positions of the plurality of trigger regions are arranged in one of ascending order and descending order of sensitivities respectively corresponding to the plurality of trigger regions.

6. The method according to claim 1, wherein the joystick control comprises a plurality of direction scopes corresponding to different movement directions; and the method further comprises:

determining, from the plurality of direction scopes, a first direction scope based on a real-time position of the first sliding operation relative to the joystick control; and controlling the virtual object to move toward a movement direction corresponding to the first direction scope.

7. A computer device, comprising a processor and a memory, the memory having a computer program stored therein, and the computer program being loaded and executed by the processor and causing the computer device to perform a method for controlling a virtual object in a virtual environment including:

displaying a joystick control for controlling movement of the virtual object in the virtual environment, the joystick control comprising a plurality of trigger regions, each trigger regions having a unique sensitivity;

detecting a first sliding operation on a screen of the computer device whose start position is located in a first trigger region of the plurality of trigger regions;

determining a first movement speed of the virtual object based on a sensitivity of the first trigger region; and controlling the virtual object to move at the first movement speed;

obtaining a distance between a real-time position of the first sliding operation and the start position of the first sliding operation;

when the distance is greater than or equal to a first threshold, displaying an automatic movement control initiated by the first sliding operation on the screen of the computer device, wherein the automatic movement control is configured to trigger automatic running of the virtual object after a termination of the first sliding operation; and after determining that the automatic movement control initiated by the first sliding operation is in a display state, canceling the displaying of the automatic movement control when the distance is less than or equal to a second threshold, wherein the second threshold is less than the first threshold and the running of the virtual object stops after the termination of the first sliding operation.

8. The computer device according to claim 7, wherein the determining a first movement speed of the virtual object based on a sensitivity of the first trigger region comprises:

determining the first movement speed of the virtual object based on the sensitivity of the first trigger region and a distance between a real-time position and the start position that are of the first sliding operation.

9. The computer device according to claim 7, wherein an overlapping region exists between at least two of the plurality of trigger regions, and the method further comprises:

determining a distance between the start position of the first sliding operation and a reference point of each of the trigger regions; and determining, from the plurality of trigger regions, a trigger region having a smallest distance as the first trigger region.

10. The computer device according to claim 7, wherein the method further comprises:

obtaining real-time competitive data related to the virtual object;

determining a recommended trigger region from the plurality of trigger regions based on the real-time competitive data; and displaying prompt information corresponding to the recommended trigger region.

11. The computer device according to claim 7, wherein positions of the plurality of trigger regions are arranged in one of ascending order and descending order of sensitivities respectively corresponding to the plurality of trigger regions.

12. The computer device according to claim 7, wherein the joystick control comprises a plurality of direction scopes corresponding to different movement directions; and the method further comprises:

determining, from the plurality of direction scopes, a first direction scope based on a real-time position of the first sliding operation relative to the joystick control; and controlling the virtual object to move toward a movement direction corresponding to the first direction scope.

13. A non-transitory computer-readable storage medium, having a computer program stored therein, the computer program being loaded and executed by a processor of a computer device and causing the computer device to perform a method for controlling a virtual object in a virtual environment including:

displaying a joystick control for controlling movement of the virtual object in the virtual environment, the joystick control comprising a plurality of trigger regions, each trigger regions having a unique sensitivity;

detecting a first sliding operation on a screen of the computer device whose start position is located in a first trigger region of the plurality of trigger regions;

determining a first movement speed of the virtual object based on a sensitivity of the first trigger region; and controlling the virtual object to move at the first movement speed;

obtaining a distance between a real-time position of the first sliding operation and the start position of the first sliding operation;

when the distance is greater than or equal to a first threshold, displaying an automatic movement control initiated by the first sliding operation on the screen of the computer device, wherein the automatic movement control is configured to trigger automatic running of the virtual object after a termination of the first sliding operation; and after determining that the automatic movement control initiated by the first sliding operation is in a display state, canceling the displaying of the automatic movement control when the distance is less than or equal to a second threshold, wherein the second threshold is less than the first threshold and the running of the virtual object stops after the termination of the first sliding operation.

14. The non-transitory computer-readable storage medium according to claim 13, wherein the determining a first movement speed of the virtual object based on a sensitivity of the first trigger region comprises:

determining the first movement speed of the virtual object based on the sensitivity of the first trigger region and a distance between a real-time position and the start position that are of the first sliding operation.

15. The non-transitory computer-readable storage medium according to claim 13, wherein an overlapping region exists between at least two of the plurality of trigger regions, and the method further comprises:

determining a distance between the start position of the first sliding operation and a reference point of each of the trigger regions; and determining, from the plurality of trigger regions, a trigger region having a smallest distance as the first trigger region.

16. The non-transitory computer-readable storage medium according to claim 13, wherein the method further comprises:

obtaining real-time competitive data related to the virtual object;

determining a recommended trigger region from the plurality of trigger regions based on the real-time competitive data; and displaying prompt information corresponding to the recommended trigger region.

17. The non-transitory computer-readable storage medium according to claim 13, wherein the joystick control comprises a plurality of direction scopes corresponding to different movement directions; and the method further comprises:

determining, from the plurality of direction scopes, a first direction scope based on a real-time position of the first sliding operation relative to the joystick control; and controlling the virtual object to move toward a movement direction corresponding to the first direction scope.

* * * * *